United States Patent
Wang et al.

(10) Patent No.: US 9,323,217 B2
(45) Date of Patent: *Apr. 26, 2016

(54) METAMATERIAL AND DYNAMICALLY RECONFIGURABLE HOLOGRAM EMPLOYING SAME

(75) Inventors: Shih-Yuan Wang, Palo Alto, CA (US); Alexandre M. Bratkovski, Mountain View, CA (US); R. Stanley Williams, Portola Valley, CA (US); Jingjing Li, Sunnyvale, CA (US); Wei Wu, Palo Alto, CA (US); Philip J. Kuekes, Menlo Park, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1278 days.

This patent is subject to a terminal disclaimer.

(21) Appl. No.: 13/142,484

(22) PCT Filed: Dec. 29, 2008

(86) PCT No.: PCT/US2008/014085
§ 371 (c)(1),
(2), (4) Date: Jun. 28, 2011

(87) PCT Pub. No.: WO03/036993
PCT Pub. Date: May 1, 2003

(65) Prior Publication Data
US 2011/0273755 A1    Nov. 10, 2011

(51) Int. Cl.
*G03H 1/08* (2006.01)
*G03H 1/02* (2006.01)
*G03H 1/22* (2006.01)
*G02B 1/00* (2006.01)

(52) U.S. Cl.
CPC ............... *G03H 1/02* (2013.01); *G03H 1/2294* (2013.01); *G02B 1/007* (2013.01); *G03H 1/2249* (2013.01); *G03H 2001/0224* (2013.01); *G03H 2210/30* (2013.01); *G03H 2225/22* (2013.01); *G03H 2225/32* (2013.01); *G03H 2225/33* (2013.01)

(58) Field of Classification Search
None
See application file for complete search history.

(56) References Cited

U.S. PATENT DOCUMENTS

| 7,710,336 | B2 * | 5/2010 | Schweizer et al. | 343/754 |
| 8,107,149 | B2 * | 1/2012 | Wu et al. | 359/237 |
| 8,134,774 | B2 * | 3/2012 | Wang et al. | 359/333 |
| 8,149,485 | B2 * | 4/2012 | Li et al. | 359/9 |

(Continued)

FOREIGN PATENT DOCUMENTS

| WO | WO-03/036993 | 5/2003 |
| WO | WO 2007048468 A1 * | 5/2007 |

OTHER PUBLICATIONS

Claims for U.S. Appl. No. 13/264,073, filed Apr. 24, 2014.*

*Primary Examiner* — Arnel C Lavarias
(74) *Attorney, Agent, or Firm* — Sughrue Mion, PLLC

(57) ABSTRACT

A negative index material (or metamaterial) crossbar includes a first layer of approximately parallel nanowires and a second layer of approximately parallel nanowires that overlay the nanowires in the first layer. The nanowires in the first layer are approximately perpendicular in orientation to the nanowires in the second layer. Each nanowire of the first layer and each nanowire of the second layer has substantially regularly spaced fingers. The crossbar further includes resonant elements at nanowire intersections between the respective layers. Each resonant element includes two fingers of a nanowire in the first layer and two fingers of a nanowire in the second layer.

20 Claims, 17 Drawing Sheets

(56) References Cited

U.S. PATENT DOCUMENTS

| | | | |
|---|---|---|---|
| 8,280,054 B2* | 10/2012 | Bratkovski | 380/256 |
| 8,477,408 B2* | 7/2013 | Li | 359/319 |
| 8,797,382 B2* | 8/2014 | Li et al. | 348/41 |
| 2003/0063339 A1 | 4/2003 | Snider | |
| 2008/0212921 A1 | 9/2008 | Gaylord et al. | |
| 2013/0050409 A1* | 2/2013 | Li et al. | 348/41 |

* cited by examiner

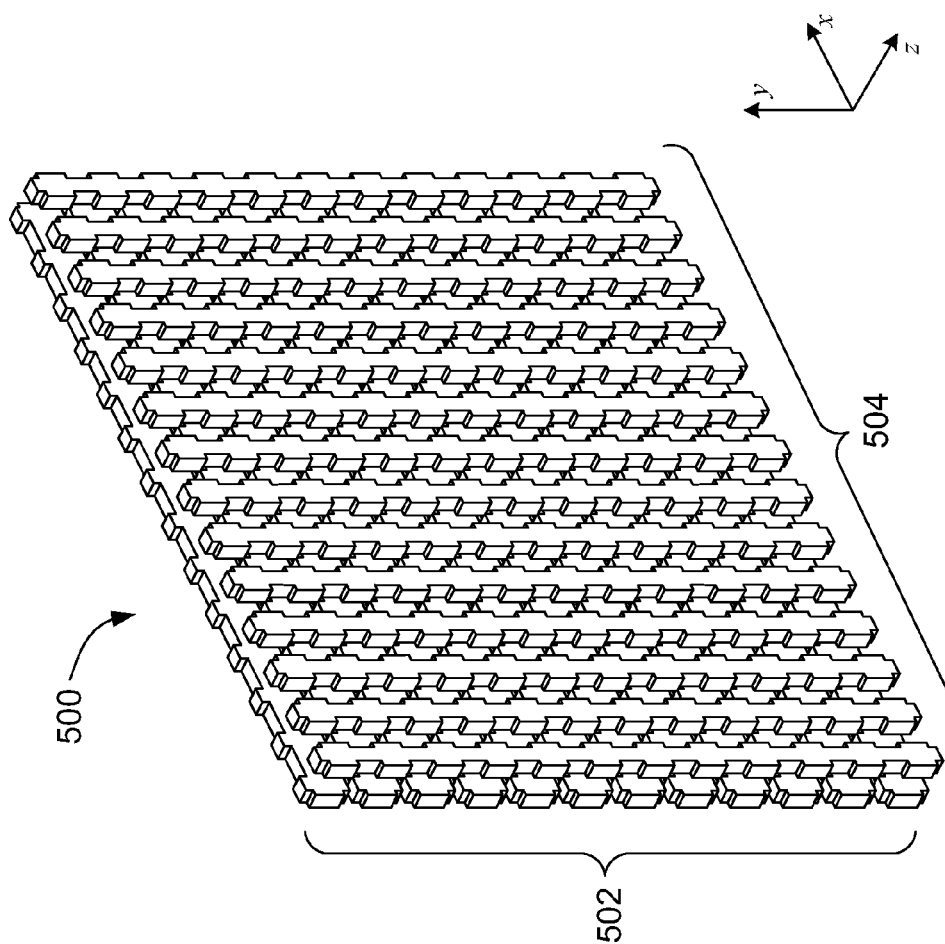

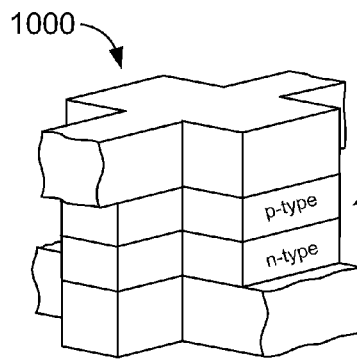
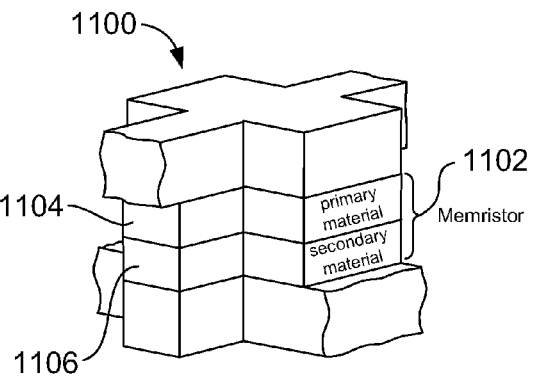
Figure 10          Figure 11A
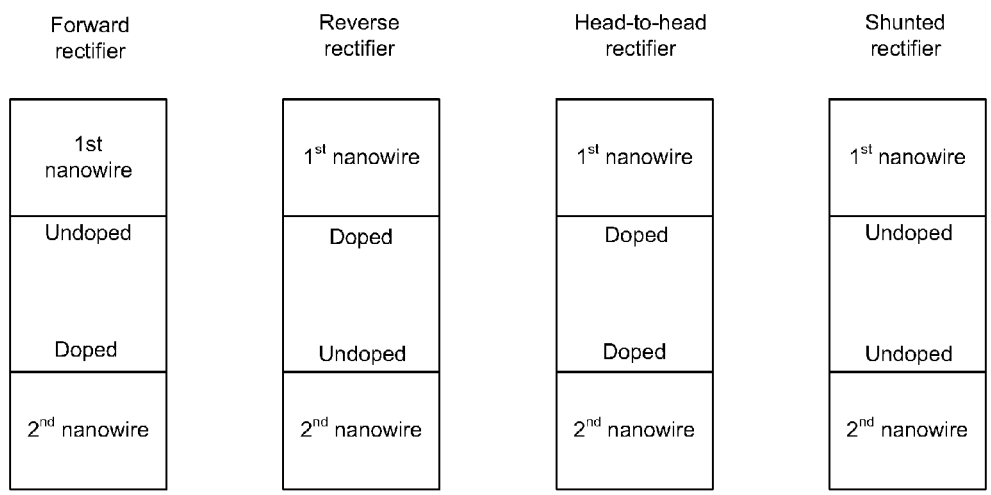
Figure 11B

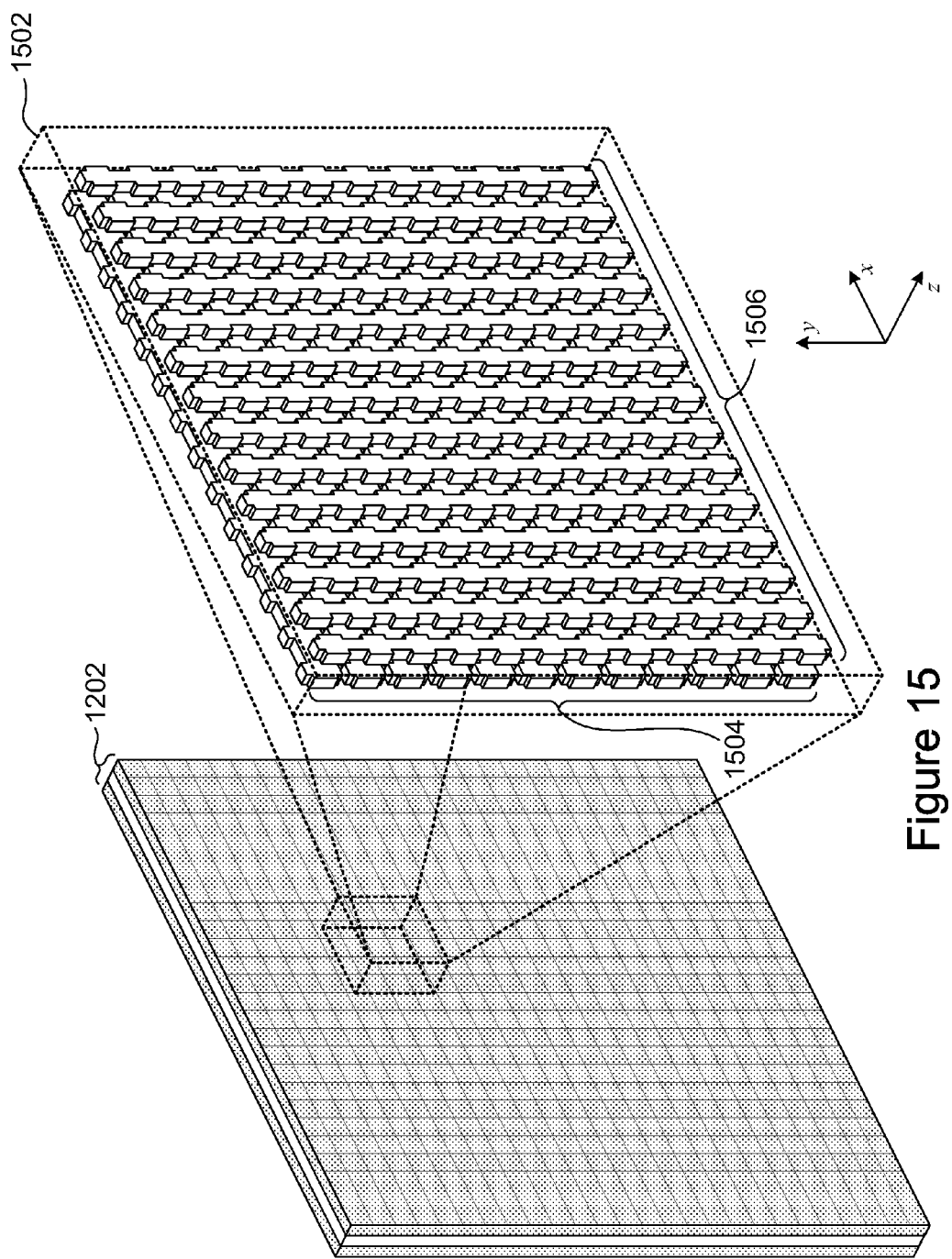

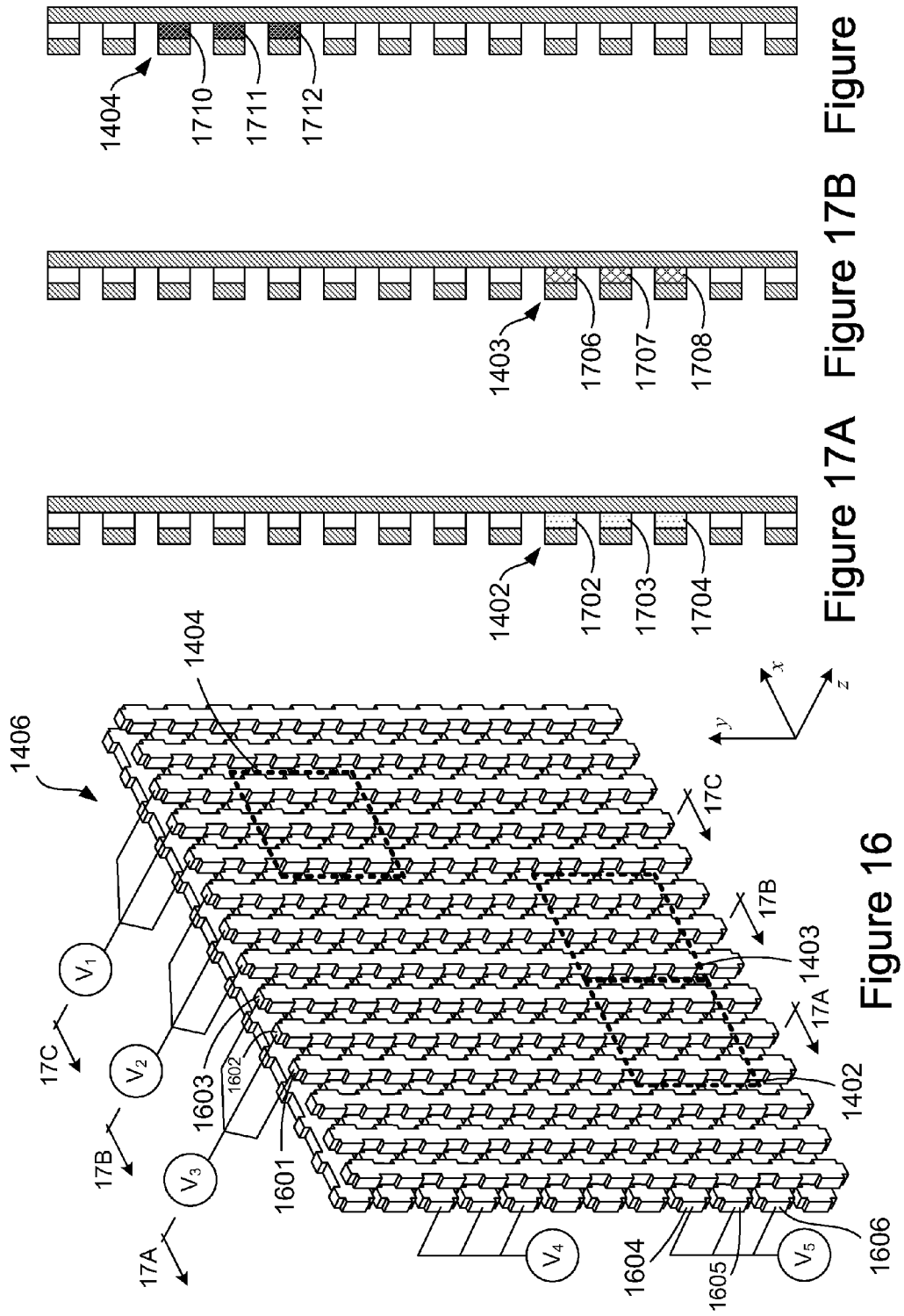

METAMATERIAL AND DYNAMICALLY RECONFIGURABLE HOLOGRAM EMPLOYING SAME

STATEMENT OF GOVERNMENT INTEREST

This invention has been made with government support under Contract No. HR0011-05-3-0002, awarded by Defense Advanced Research Projects Agency. The government has certain rights in the invention.

TECHNICAL FIELD

Embodiments of the present invention relate to holograms, and, in particular, to dynamically reconfigurable metamaterial-based holograms for generating three-dimensional images.

BACKGROUND

Photographs compress images of three-dimensional objects into flat, two-dimensional images displayed by a piece of paper, and television and motion pictures also compress images of moving three-dimensional objects into flat, moving, two-dimensional images displayed on a screen. Photographs, television, and motion pictures are examples of media that display three-dimensional objects as simply intensity mappings. In other words, when an image of a scene is ordinarily reproduced in a photograph or motion picture, a viewer does not see an accurate reproduction of the light scattered from the object, but instead a viewer sees a point-by-point record of just the square of the electromagnetic radiation amplitude (i.e., the intensity) reflected from the object. For example, the light reflected off a photograph carries with it information about the intensity of the object displayed by the photograph but nothing about the electromagnetic wavefronts that were once scattered from the object during the taking of the photograph. As a result, a viewer only perceives a two-dimensional image of the object. However, when the electromagnetic wavefronts scattered from an object can be reconstructed for a viewer, the viewer sees wavefronts that are indistinguishable from the wavefronts scattered from the original object. Thus, the viewer is able to see a reformed three-dimensional image of the object, as if the object was actually before the viewer.

Holography is a method of recording and showing a still three-dimensional image of an object using a hologram and ideally monochromatic light from a laser. A conventional hologram is a still record of intensity and wavefronts scattered from an object with respect to an incident reference light that contains point-by-point information for reproducing a three-dimensional holographic image of the object, but is not an image of the object. The hologram is used to reconstruct a three-dimensional holographic image of the object in approximately the same position that the object was in when it was recorded. The holographic image changes as the position and orientation of the viewer changes. Thus, the holographic image of an object appears three three-dimensional to the viewer.

However, a hologram can only be used to produce a single still three-dimensional image of an object. The systems used to generate holograms and holographic images are bulky, and the time and number of steps performed to produce a single hologram make current holographic methods and systems impractical for producing three-dimensional motion pictures of objects. Thus, it is desirable to have holographic methods and compact holographic systems that enable the production of full three-dimensional motion pictures.

BRIEF DESCRIPTION OF THE DRAWINGS

FIG. 5 shows an isometric view of a negative index material crossbar configured in accordance with embodiments of the present invention.

FIG. 10 shows an isometric vices a resonant view of a resonant element configured with a p-n junction intermediate layer in accordance with embodiments of the present invention.

FIG. 11A shows an isometric view of a resonant element configured with an intermediate memristors layer in accordance with embodiments of the present invention.

FIG. 11B shows four cross-sectional views of dopant distributions in memristor elements in accordance with embodiments of the present invention.

FIG. 15 shows an isometric view and an enlargement of a region of a phase-control layer in accordance with embodiments of the present invention.

FIG. 16 shows an isometric view and an enlargement of a region of the phase-control layer shown in FIG. 14 in accordance with embodiments of the present invention.

FIGS. 17A-17C show cross-sectional views of three phase-modulation pixels shown in FIG. 16 in accordance with embodiment of the present invention.

DETAILED DESCRIPTION

Various embodiments of the present invention relate to negative refractive index-based systems that can be used as holograms and can be electronically controlled and dynamically reconfigured to generate one or more three-dimensional motion pictures. The systems include a phase-control layer and an intensity-control layer. The phase-control layer is composed of crossbar array that enables individual pixels to be electrically addressed and allows for pixelized phase modulation of refracted or reflected electromagnetic radiation. As a result, the phase-control and intensity-control layers produce phase and intensity changes in refracted or reflected light that can be dynamically controlled pixel-by-pixel in order to dynamically display one or more three-dimensional images.

Negative Index Materials

Negative index materials ("NIMs"), also called metamaterials, are materials with optical properties resulting from the structure of the material rather than from chemical composition of the material. Natural materials have positive permeability, $\mu$, and may have positive or negative dielectric permittivity $\in$, depending on the type of conductivity of the material and frequency ranges. In contrast, NIMs have simultaneously negative $\in$ and $\mu$, which results in optical properties that are different from those of ordinary composite materials. The optical properties of NIMs can be appreciated by comparing and contrasting the optical properties of NIMs with the optical properties of ordinary composite materials, as described in *Electrodynamics of Metamaterials*, by A. K. Sarychev and V. M. Shalaev (World Scientific, New York, 2007). For example, consider Maxwell's first-order differential equations for an electromagnetic wave propagating in an ordinary composite material with a time harmonic field as follows:

$$\nabla \times \vec{E} = -j\omega\mu\vec{H}$$

$$\nabla \times \vec{H} = j\omega\in\vec{E}$$

where $\vec{E}$ is the electric field component, $\vec{H}$ is the magnetic field component, $j=\sqrt{-1}$, and $\omega$ is the angular frequency. The solutions of these equations are the plane-wave fields:

$$\vec{E} = \vec{E}_0 \exp(-j\vec{k}_o \Box \vec{r})$$

$$\vec{H} = \vec{H}_0 \exp(-j\vec{k}_o \Box \vec{r})$$

Figure 1A:
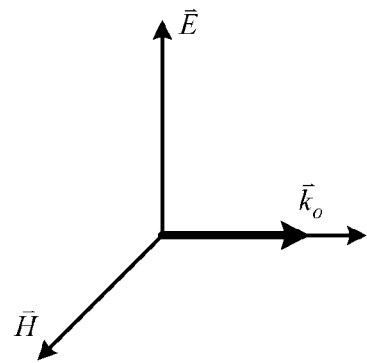
FIGS. 1A-1B show wave and Poynting vector directions for electromagnetic waves propagating in an ordinary right-handed medium.
Figure 1B:
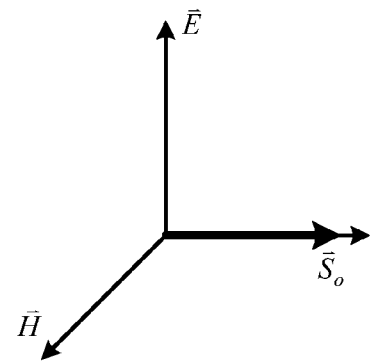

Substituting the plane-wave equations into Maxwell's first order differential equations gives the relations:

$$\vec{k}_o \times \vec{E} = \omega\mu\vec{H}$$

$$\vec{k}_o \times \vec{H} = -\omega\in\vec{E}$$

where $\vec{k}_o$ is a wavevector indicating the direction an electromagnetic wave propagates within a composite material. FIG. 1A shows the spatial relationship and relative orientation of the vectors $\vec{E}$, $\vec{H}$, and $\vec{k}_o$ and reveals that for an ordinary composite material with positive $\in$ and $\mu$, the vectors $\vec{E}$, $\vec{H}$, and $\vec{k}_o$ form an orthogonal, right-handed system of vectors. In addition, the direction of the time-averaged energy flux of the electromagnetic wave is given by the real component of the Poynting vector:

$$\vec{S}_o = \frac{1}{2}\text{Re}(\vec{E} \times \vec{H}^*)$$

which, as shown in FIG. 1B, reveals that the vectors $\vec{E}$, $\vec{H}$, and $\vec{S}_o$ also form an orthogonal, right-handed vector system. In other words, FIGS. 1A and 1B, show that for an electromagnetic wave propagating through a ordinary composite material, the propagation direction identified by the wavevector $\vec{k}_o$ and the direction of the energy carried by the electromagnetic wave identified by the Poynting vector $\vec{S}_o$ are the same.

Figure 2A:
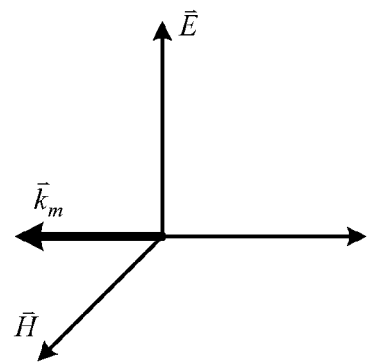
FIGS. 2A-2B show wave and Poynting vector directions for electromagnetic waves propagating in a negative index metamaterial.
Figure 2B:
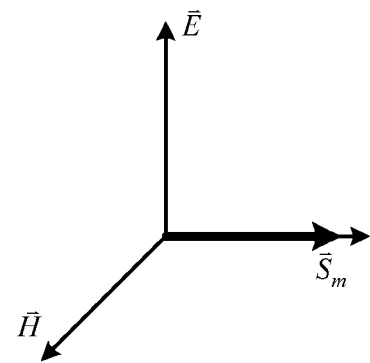

On the other hand, consider NIMs, where $\in<0$ and $\mu<0$. Maxwell's first order differential equations give the relations:

$$\vec{k}_m \times \vec{E} = -\omega|\mu|\vec{H}$$

$$\vec{k}_m \times \vec{H} = \omega|\in|\vec{E}$$

where $\vec{k}_m$ is a wavevector indicating the direction the phase of the electromagnetic wave propagates in a NIM. As shown in FIG. 2A, and in contrast to the composite materials shown in FIG. 1A, for NIMs, the vectors $\vec{E}$, $\vec{H}$, and $\vec{k}_m$ form an orthogonal, left-handed system of vectors. In other words, comparing the directions of the wavefronts represented by the wavevectors $\vec{k}_c$ and $\vec{k}_m$ shown in FIGS. 1A and 2A, respectively, reveals that electromagnetic waves propagate backwards in NIMs for the same orientation of the vectors $\vec{E}$ and $\vec{H}$. Thus, NIMs are also referred to as "left-handed media" or "backward media." However, as shown in FIG. 2B, the Poynting vector $\vec{S}_m$ in a metamaterial is unaffected by the change of sign of $\in$ and $\mu$, and the vectors $\vec{E}$, $\vec{H}$, and $\vec{S}_m$ still form an orthogonal, right-handed system of vectors in a left-handed medium. Therefore, in NIMs, energy and wavefronts travel in opposite directions.

Now consider the refraction of an incident ray at the interface between ordinary and left-handed media. Based on the properties of electromagnetic waves travelling in NIMs described above, it follows that, unlike refraction observed in ordinary media, the angles-of-incidence and refraction have opposite signs. Snell's law in NIMs becomes:

$$\frac{\sin\theta_1}{\sin\theta_2} = \frac{-|k_2|}{|k_1|} \equiv \frac{n_2}{n_1} < 0,$$

where the subscripts 1 and 2 identify ordinary and left-handed media, respectively. Assuming $n_1>0$, from Snell's law it follows that $n_2<0$. That is, the sign of the square root in the definition of the refractive index is chosen to be negative:

$$n_2 = -\sqrt{\in\mu<0}$$

Hence the term "negative index material" is used to refer to materials having both negative $\in$ and $\mu$.

Figure 3:
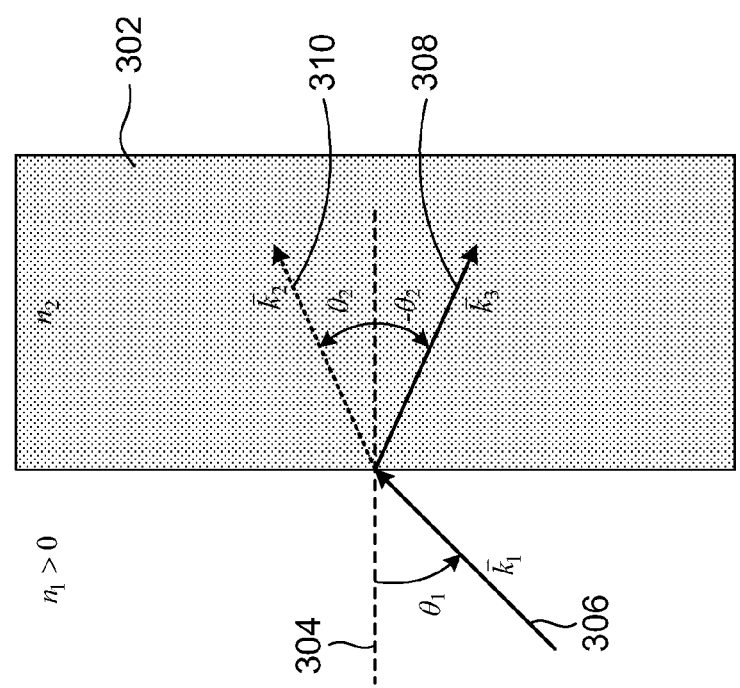
FIG. 3 shows refraction of rays of light in an ordinary right-handed medium and a negative index metamaterial.

FIG. 3 shows refraction of rays of light in an ordinary right-handed medium and a negative index metamaterial. Dashed line 304 represents a surface normal extending perpendicular to the surface of a medium 302. As shown in FIG. 3, angle $\theta_1$ and wavevector $\vec{k}_1$ 306 represent the angle-of-incidence and direction of a ray of light propagating through an ordinary medium with index of refraction $n_1>0$ and is incident on the medium 302. Angle $-\theta_2$ and wavevector $\vec{k}_3$ 308 represent the angle-of-refraction and direction of a refracted ray of light propagating within the medium 302 with refractive index $n_2<0$, while angle $\theta_2$ and wavevector $\vec{k}_2$ 310 represent the angle-of-refraction and direction of a refracted ray of light propagating within the medium 302 with refractive index $n_2>0$, where $|n_2|>n_1$. Thus, for the medium 302 with a refractive index of $n_2<0$, the incident ray 306 and the refracted ray 308 lie on the same side of the surface normal 304, and for the medium 302 with a refractive index of $n_2>0$, the incident ray 306 and the refracted ray 310 lie on opposite sides of the surface normal 304.

Figure 4:
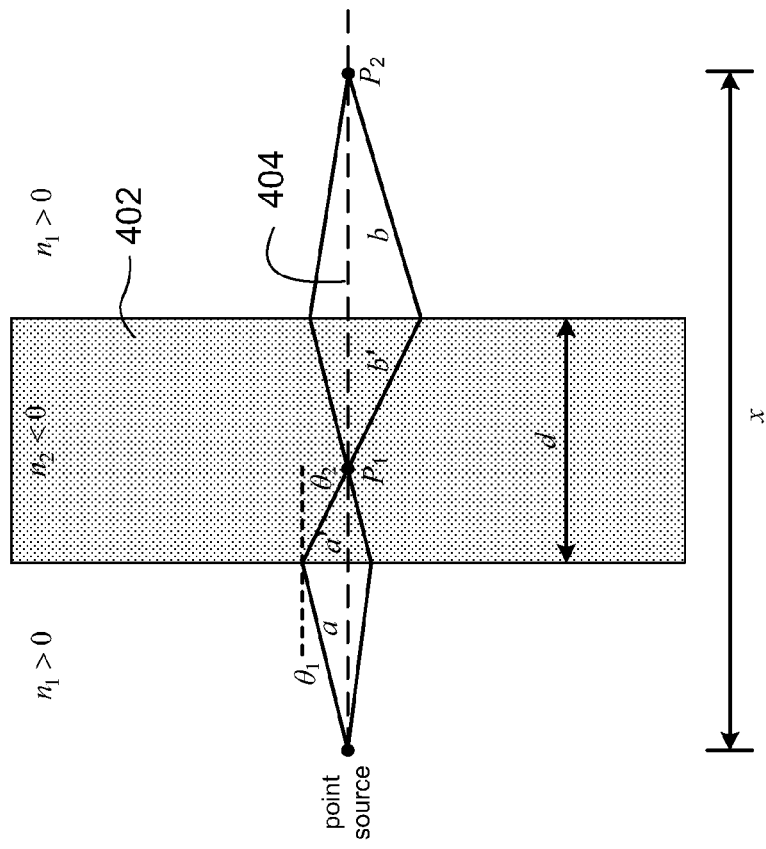
FIG. 4 shows focusing properties of a metamaterial slab for light emanating from a point source.

Tracing the paths of optical rays through conventional concave and convex lens made of left-handed media reveals that concave lenses become convergent and convex lens become divergent, thus reversing the behavior of lenses comprising ordinary media. FIG. 4 shows focusing properties of a slab 402 composed of a NIM for light emanating from a point source. For incident rays paraxial to an optical axis 404, Snell's law gives:

$$|n| = \frac{|n_2|}{n_1} = \frac{|\sin\theta_1|}{|\sin\theta_2|} \square \frac{|\tan\theta_1|}{|\tan\theta_2|} = \frac{a'}{a} = \frac{b'}{b}$$

where n is the refractive index $n_2$ of the slab 402 relative to refractive index of the surrounding medium $n_1$. As shown in FIG. 4, rays emanating from the point source are focused at two points $P_1$ and $P_2$. Point $P_1$ lies inside the slab 402 and point $P_2$ lies on the side of the slab 402 opposite the point source. The distance from the point source to the second focusing point $P_2$ is given by:

$$x = a + a' + b' + b = d + \frac{d}{|n|}$$

where d is the width of the slab. When n equals −1, the focusing effect is not restricted to paraxial rays, because in this case $|\theta_1|$ equals $|\theta_2|$ for any angle-of-incidence. In fact, when n equals −1, all rays emanating from the point source are focused at two points, the latter point $P_2$ being at a distance 2d from the point source. Thus, unlike slabs comprising ordinary composite materials, slabs composed of NIMs can be configured to focus light.

Negative Index Material Crossbars

FIG. 5 shows an isometric view of a NIM crossbar 500 configured in accordance with embodiments of the present invention. The NIM crossbar 500 reveals a crossbar array composed of a first layer of approximately parallel nanowires 502 that are overlain by a second layer of approximately parallel nanowires 504. The nanowires of the first layer 502 run substantially parallel to the x-axis and are approximately perpendicular, in orientation, to the nanowires of the second layer 504, which run substantially parallel to the y-axis, although the orientation angle between the nanowires of the layers 502 and 504 may vary. The two layers of nanowires form a lattice, or crossbar, with each nanowire of the second layer 504 overlying all of the nanowires of the first layer 502 and coming into close contact with each nanowire of the first layer 502 at nanowire intersections called "resonant elements" that represent the closest contact between two nanowires.

Figure 6:
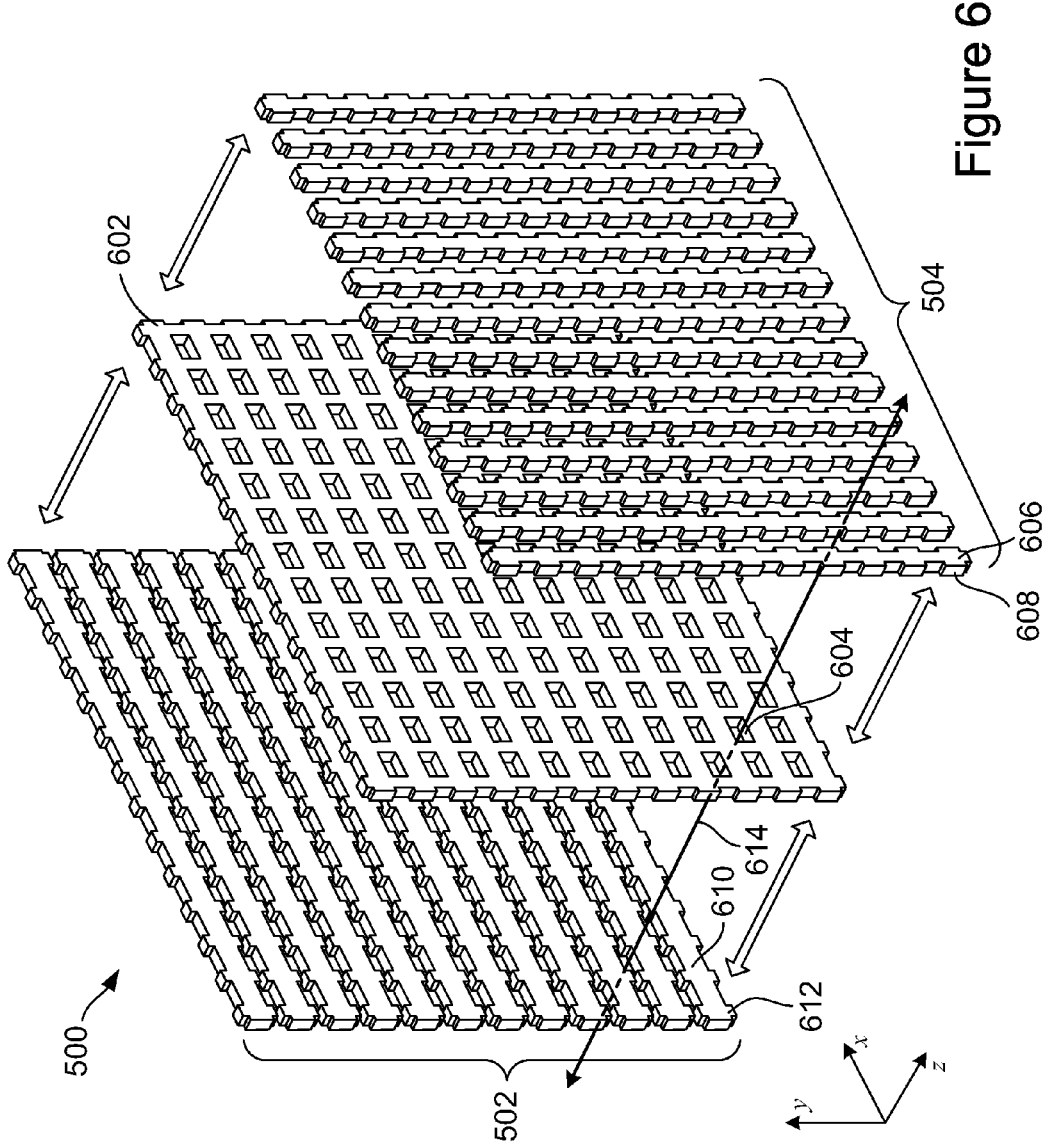
FIG. 6 shows an exploded isometric view of the negative index material crossbar configured in accordance with embodiments of the present invention.

FIG. 6 shows an exploded isometric view of the NIM crossbar 500 configured in accordance with embodiments of the present invention. FIG. 6 reveals an intermediate layer 602 sandwiched between the first layer of nanowires 502 and the second layer of nanowires 504. As shown in the example of FIG. 6, the intermediate layer 602 is a continuous layer including an array of regularly spaced holes, such as hole 604. In certain embodiments, as shown in FIG. 6, the holes can be rectangular, and in other embodiments, the holes can be square. The nanowires in the first layer 502 have relatively larger cross-sectional dimensions than the nanowires comprising the second layer 504. FIG. 6 also reveals that the nanowires in both the first and second layers 502 and 504 are configured with substantially regularly spaced protuberances called "fingers" that are separated by notches. For example, nanowire 606 includes a finger 608 and nanowire 610 includes a finger 612. The fingers of nanowires of one layer are approximately parallel to the length of the nanowires in the other layer. The fingers of adjacent nanowires are also substantially aligned within the first and second layers 502 and 504, and the holes in the intermediate layer 602 are substantially aligned with the notches between fingers in the first and second layers 502 and 504. For example, line 614 passes through notches in the first layer 502 passes through the hole 604 in the intermediate layer 602 and passes through notches in the second layer 504.

Figure 7:
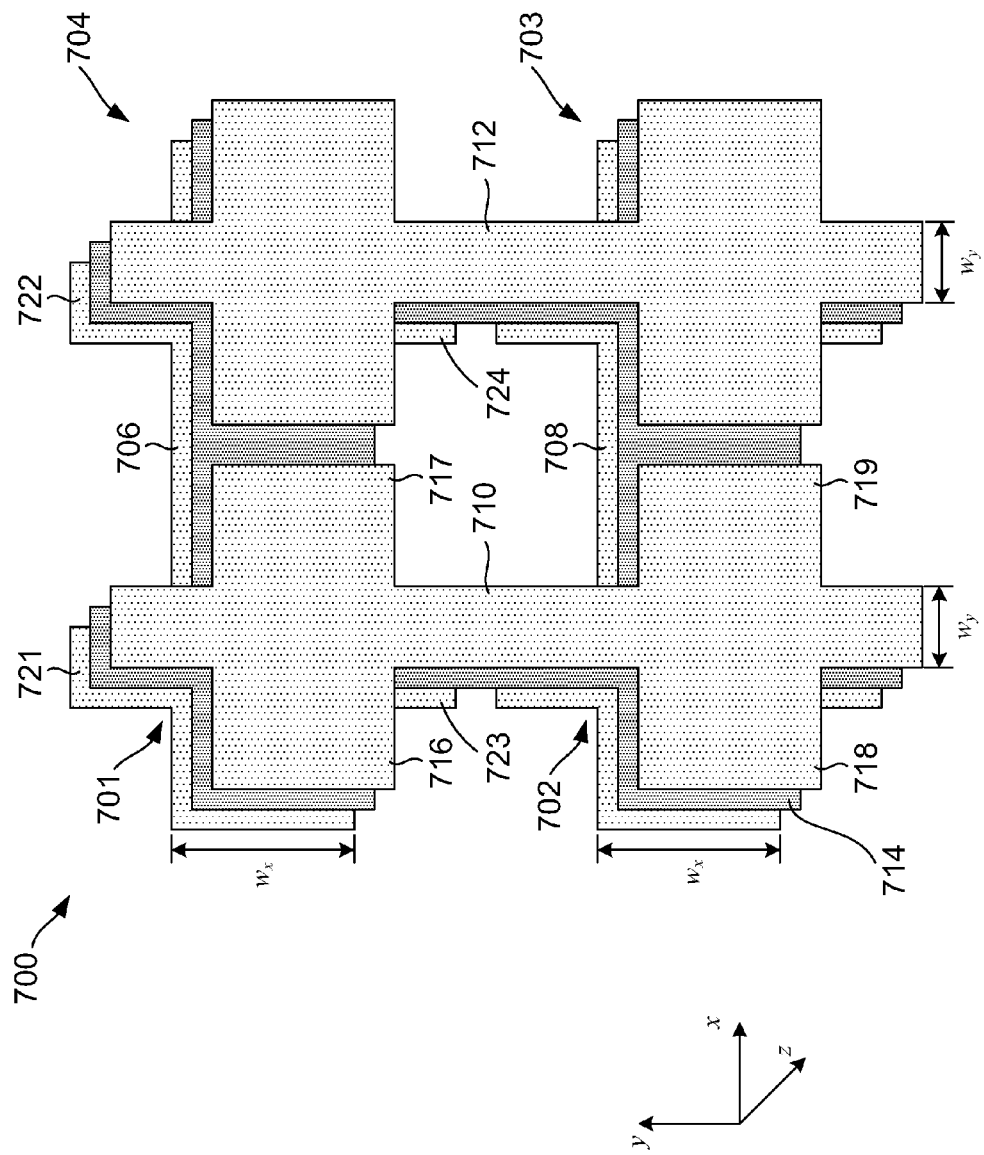
FIG. 7 shows an isometric view of an enlargement of a four adjacent resonant elements of the negative index material crossbar configured in accordance with embodiments of the present invention.

FIG. 7 shows an isometric view of an enlargement 700 of a four adjacent resonant elements 701-704 of the NIM crossbar 500 configured in accordance with embodiments of the present invention. The resonant elements 701-704 are formed by nanowires 710 and 712 extending in the x-direction overlaying portions of nanowires 706 and 708 extending in the y-direction. The nanowires 706 and 708 are separated from the nanowires 710 and 712 by a portion 714 of intermediate layer 602. The width $w_x$ of the nanowires 706 and 708 in the first layer 502 is larger than the width $w_y$ of the nanowires 710 and 712 in the second layer 504. The nanowires 710 and 712 include fingers protruding in the x-direction, such as fingers 716-719 of nanowire 710, and nanowires 706 and 708 include fingers protruding in the y-direction, such as fingers 721-724 of nanowire 708. The fingers of adjacent nanowires lying in the same layer are separated by gaps. As shown in FIG. 7, each of the resonant elements 701-704 includes two fingers of a nanowire in the first layer 502 and two fingers of a nanowire in the second layer 504. For example, resonant element 701 includes fingers 716 and 717 of nanowire 710 and fingers 721 and 723 of nanowire 706.

Figure 8:
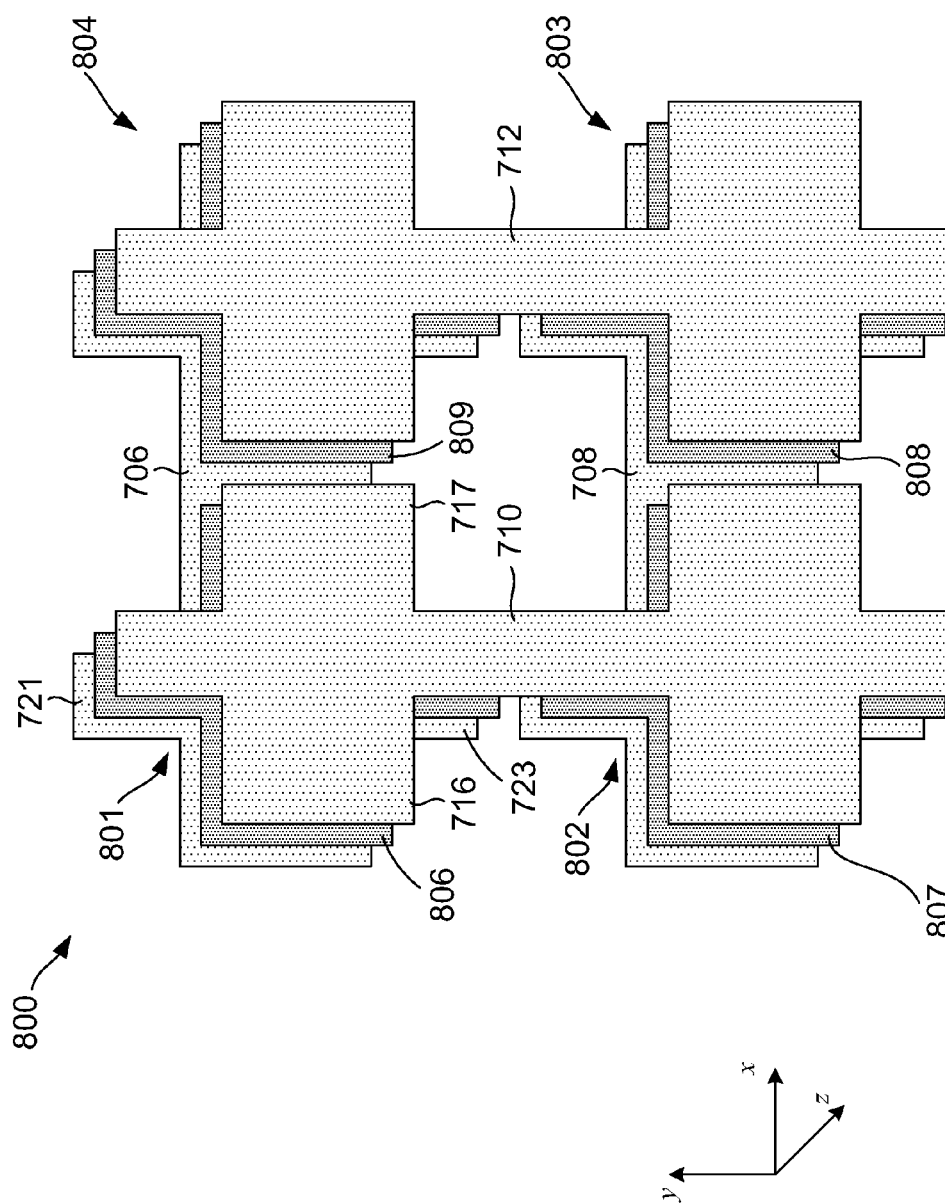
FIG. 8 shows an isometric view of an enlargement of four adjacent resonant elements of a negative index material crossbar configured in accordance with embodiments of the present invention.

In other embodiments, the intermediate layer 602 may be composed of discrete portions of a material lying within each resonant element. FIG. 8 shows an isometric view of an enlargement 800 of four adjacent resonant elements 801-804 of a NIM crossbar configured in accordance with embodiments of the present invention. The resonant elements 801-804 include intermediate plus-shaped layers 806-809, respectively, disposed within the region between the fingers of nanowires 710 and 712 overlaying nanowires 706 and 708. As shown in FIG. 8, adjacent plus-shaped layers 806-809 are separated by gaps, and each plus-shaped layer fills the space between the nanowire of one layer and the fingers of a nanowire in another layer. For example, plus-shaped layer 801 is configured to fill the space between fingers 721 and 723 and nanowire 710 and fill the space between fingers 716 and 717 and nanowire 706.

Embodiments of the present invention are not limited to the rectangular configurations for the fingers of the nanowires, as shown in FIGS. 5-8. In other embodiments, the fingers can be elliptical, circular, square, irregularly shaped, or have more complex shapes, dictated by design of supporting a magnetoplasmon resonance and related NIM behavior over a particular frequency range. Although the fingers shown in FIGS. 5-8 have clearly defined edges, in other embodiments, the fingers may have rounded edges.

Although individual nanowires shown in FIG. 5-8 have rectangular cross sections, nanowires can also have square, circular, elliptical, or more complex cross sections. The nanowires may be configured to have many different widths or diameters and aspect ratios or eccentricities ranging from approximately ⅕ to approximately ½₀ of the wavelength of incident light or ranging from approximately 20 nm to approximately 200 nm. The term "nanowire crossbar" may refer to crossbars having one or more layers of sub-microscale wires, microscale wires, or wires with larger cross-sectional dimensions, in addition to nanowires. The nanowires can be comprised of silver ("Ag"), gold ("Au"), copper ("Cu"), aluminum ("Al"), platinum ("Pt"), or another suitable electronically conducting metal, or the nanowires can be composed of heavily doped semiconductors depending on the frequency of incident light.

The crossbar layers can be fabricated by mechanical nanoimprinting techniques. Alternatively, nanowires can be chemically synthesized and can be deposited as layers of approximately parallel nanowires in one or more processing steps, including Langmuir-Blodgett processes with subsequent patterning. Other alternative techniques for fabricating nanowires may also be employed. Thus, a two-layer nanowire crossbar comprising first and second layers of nanowires, as shown in FIGS. 5-8, can be manufactured by any of numerous relatively straightforward processes. Many different types of conductive and semi-conductive nanowires can be chemically synthesized from metallic and semiconductor substances, from combinations of these types of substances, and from other types of substances. A nanowire crossbar may be connected to microscale address-wire leads or other electronic leads, through a variety of different methods in order to electronically couple the nanowires to electronic devices.

The resonant elements can be configured with dimensions that are smaller than the wavelength λ of light incident on the crossbar 500 enabling the crossbar 500 to be operated as a NIM over particular wavelength ranges. In particular, the size and shape of the fingers can be selected to have an appropriate inductance, resistance, and capacitance response to the wavelengths of incident light on the crossbar. In addition, because each resonant element can be separately addressed by biasing the pair of nanowires crossing at the selected resonant element, the refractive index of the intermediate layer of each resonant element can be adjusted by applying appropriate voltages to the nanowires. The size and shape of the fingers and control over the refractive index of the intermediate layer of the resonant elements enables the crossbar 500 to be configured and operated as a NIM over particular wavelength ranges and shift the transmission phase of light transmitted through the crossbar 500.

Figure 9:
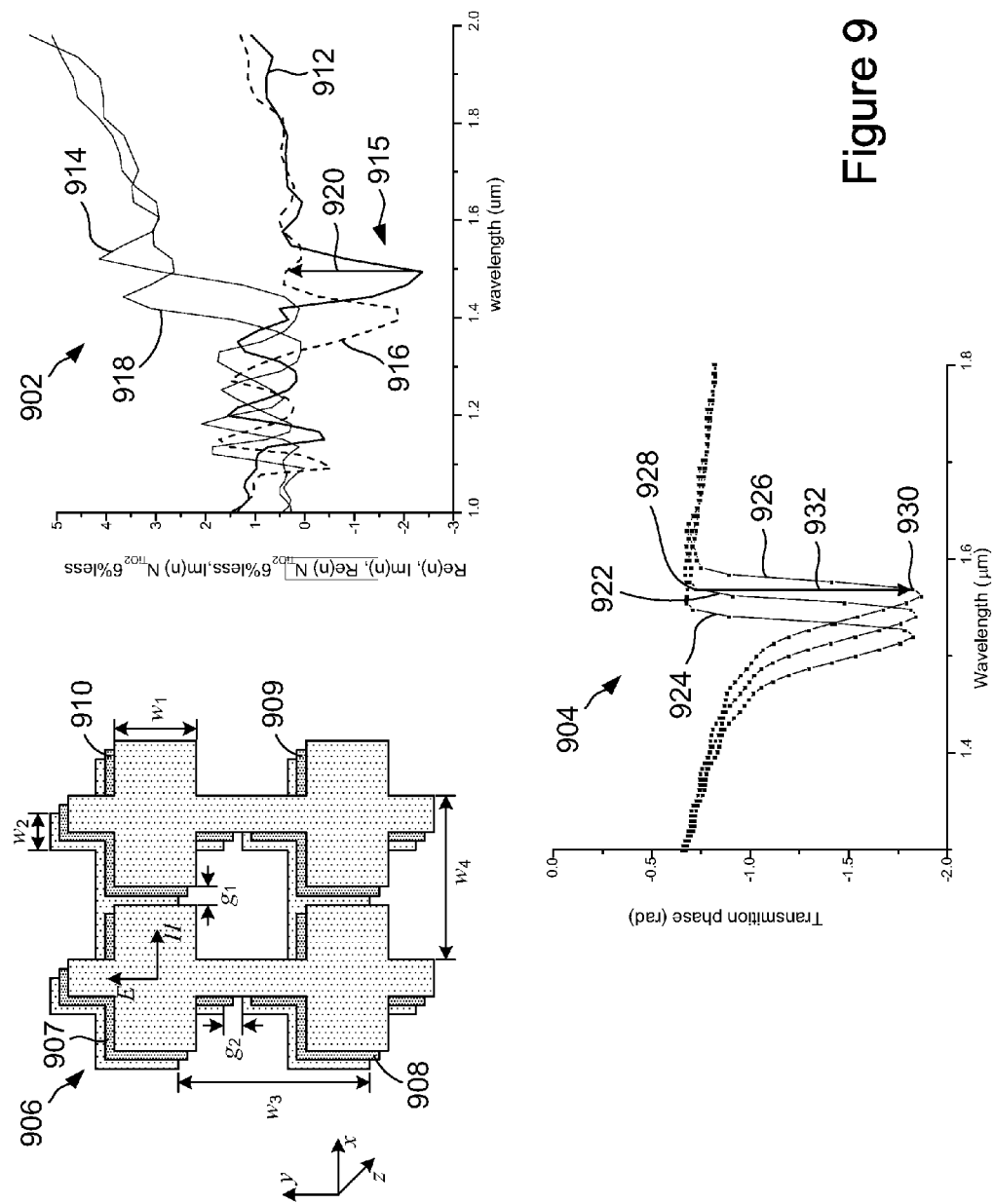
FIG. 9 shows a plot of the refractive index and phase changes for an exemplary negative index material crossbar configured and operated in accordance with embodiments of the present invention.

FIG. 9 shows a plot of the refractive index 902 and phase changes 904 for an exemplary NIM crossbar configured and operated in accordance with embodiments of the present invention. Plots 902 and 904 were obtained using the well-known finite-difference time-domain method ("FDTD") described in *Computational Electrodynamics: The Finite-Difference Time-Domain Method*, Third Edition, by Allen Taflove and Susan C. Hagness, Artech House Publishers (Jun. 30, 2005). FIG. 9 also includes a crossbar 906 representing four adjacent resonant elements with parameters identifying the dimensions of the nanowires, fingers, and spacing between resonant elements used to obtain the results displayed in plots 902 and 904. The dimensions of the parameters are provided in Table I as follows:

TABLE I

| Parameter | Dimension |
|---|---|
| $w_1$ | 225 nm |
| $w_2$ | 90 nm |
| $w_3$ | 450 nm |
| $w_4$ | 450 nm |
| $g_1$ | 45 nm |
| $g_2$ | 45 nm |

The nanowires are composed of Ag, and the plus-shaped intermediate layers 907-910 are composed of $TiO_2$ with a thickness of 60 nm.

For light polarized in the y-direction and incident on the crossbar 906 in the z-direction, curves 912 and 914 of plot 902 represent the real and imaginary refractive index components, respectively, over a range of wavelengths with no voltage applied to resonant elements of the crossbar 906. A portion 915 of the real component 912 indicates that the crossbar 906 exhibits a negative refractive index for incident light with wavelengths ranging from approximately 1.42 μm to approximately 1.55 μm with the largest negative refractive index occurring for incident light with wavelengths of approximately 1.5 μm. Curves 916 and 918 of plot 902 represent the real and imaginary refractive index components with a 6% change in the refractive index when appropriate voltages are applied to the nanowires of the crossbar 906. Curve 916 exhibits a real negative refractive index shift for incident light with wavelengths ranging from approximately 1.32 μm to approximately 1.46 μm with the largest negative refractive index occurring for incident light with wavelengths of approximately 1.4 μm. In other words, the crossbar 906 can be operated to change the refractive index that incident light encounters over particular wavelength ranges. For example, incident light with a wavelength of approximately 1.5 μm encounters the strongest real negative refractive index component when no voltage is applied to the crossbar 906. However, when appropriate voltages are applied to the nanowires, the refractive index encountered by the incident light is shifted to a positive value as indicated by directional arrow 920.

A change in the refractive index encountered by incident light shifts the transmission phase of light transmitted through the crossbar. Curves 922-926 of plot 904 represent the transmission phase of light over a range of wavelengths passing through the crossbar 906 for three different refractive indices. The transmission phase is the phase acquired by light transmitted through the crossbar 906. For example, point 928 indicates that light with a wavelength of approximately 1.58 μm transmitted through the crossbar 906 acquires a transmission phase of approximately −0.7 radians. Curve 922 represents the transmission phase acquired by light over a range of wavelengths passing through the crossbar 906 when no voltage is applied to the crossbar 906. Curve 924 represents the transmission phase acquired by light over a range of wavelengths passing through the crossbar 906 when voltages applied to the nanowires of the crossbar 906 increase the refractive index of the intermediate layers 907-910 by 3%. Curve 926 represents the transmission phase acquired by light over a range of wavelengths passing through the crossbar 906 when voltages applied to the nanowires of the crossbar 906 decrease the refractive index of the intermediate layers 907-910 by 3%. The crossbar 906 can be operated to shift the phase acquired by transmitted light. For example, when voltages corresponding to the curve 926 are applied to the crossbar 906, incident light with wavelengths of approximately 1.58 µm acquire a transmission phase of approximately 1.78 radians, which is a transmission phase shift of approximately −1.2 radians from the point 928 to the point 930, as indicated by directional arrow 932.

Resonant Elements

The refractive index of the materials selected for the intermediate layer of the resonant elements can vary according to the particular molecular configuration or electronic states of the material. The materials selected for the resonant elements exhibit an appreciable refractive index change in response to externally applied electric fields, which can be used to control the resonant behavior of the phase shift, as described above with reference to FIG. 9. In certain embodiments, the material may transition reversibly from one state to another and back, so that the resonant elements may be reconfigured, or programmed, by application of differential voltages to selected resonant elements. The molecules comprising the intermediate layers of the resonant elements may have various different states in which the molecules exhibit resistive, semiconductor-like, or conductive electrical properties. The states and relative energies of the states of the intermediate layer materials may be controlled by applying differential current levels or voltages to the overlapping nanowires forming the resonant element. For example, in certain embodiments, certain states of the intermediate layer materials can be set by applying voltages to nanowires of a resonant element. In certain embodiments, the applied voltages can change the oxidation or redox state of the intermediate layer material which induces a change in the refractive index of the resonant element. Additional circuit elements such as diodes, transistors, memristors, capacitors, and resistors for optimal performance such as multiplexing, reducing crosstalk and leakage, can be formed at resonant elements or a part of the nanowire crossbar. A nanowire crossbar can also be integrated with CMOS circuits.

In certain embodiments, the refractive index of the resonant elements can be configured and operated as p-n junctions in order to change the refractive index of the resonant elements by carrier injection. FIG. 10 shows an isometric view of a resonant element 1000 configured with a p-n junction intermediate layer 1002 in accordance with embodiments of the present invention. The p-n junction 1002 can be composed of a wide variety of semiconductor materials including various combinations of elemental and compound semiconductors. Indirect elemental semiconductors include silicon (Si) and germanium (Ge), and compound semiconductors include III-V materials, where Roman numerals III and V represent elements in the IIIa and Va columns of the Periodic Table of the Elements. Compound semiconductors can be composed of column IIIa elements, such as aluminum (Al), gallium (Ga), and indium (In), in combination with column Va elements, such as nitrogen (N), phosphorus (P), arsenic (As), and antimony (Sb). Compound semiconductors can also be further classified according to the relative quantities of III and V elements. For example, binary semiconductor compounds include semiconductors with empirical formulas GaAs, InP, InAs, and GaP; ternary compound semiconductors include semiconductors with empirical formula $GaAs_yP_{1-y}$, where y ranges from greater than 0 to less than 1; and quaternary compound semiconductors include semiconductors with empirical formula $In_xGa_{1-x}As_yP_{1-y}$, where both x and y independently range from greater than 0 to less than 1. Other types of suitable compound semiconductors include II-VI materials, where II and VI represent elements in the IIb and VIa columns of the periodic table. For example, CdSe, ZnSe, ZnS, and ZnO are empirical formulas of exemplary binary II-VI compound semiconductors.

As shown in FIG. 10, p-n junction 1002 includes a p-type layer and an n-type layer, where the p-type layer is doped with electron accepting impurities and the n-type layer is doped with electron donating impurities. The impurities also called dopants can be atoms. The dopants can be p-type impurities, which are atoms that introduce vacant electronic energy levels called "holes" to the electronic band gaps of the p-n junction 1002. These impurities are also called "electron acceptors." The dopants can be n-type impurities, which are atoms that introduce filled electronic energy levels to the electronic band gap of the p-n junction 1002. These impurities are called "electron donors." For example, boron (B), Al, and Ga are p-type impurities that introduce vacant electronic energy levels near the valence band of Si; and P, As, and Sb are n-type impurities that introduce filled electronic energy levels near the conduction band of Si. In III-V compound semiconductors, column VI impurities substitute for column V sites in the III-V lattice and serve as n-type impurities, and column II impurities substitute for column III atoms in the III-V lattice to form p-type impurities. Moderate doping of the p-type and n-type layers can have impurity concentrations in excess of about $10^{15}$ impurities/cm$^3$ while heavier doping can have impurity concentrations in excess of about $10^{19}$ impurities/cm$^3$.

The refractive index of the p-n junction 1002 can be adjusted by varying the magnitude and type of bias applied to p-n junction 1002. For example, a forward bias injects electrons into the n-type layer and vacant electronic states called "holes" are injected into the p-type layer. Under a reverse bias, electrons are injected into the p-type layer and holes are injecting into the n-type layer. However, once the bias is removed, the electrons and holes are swept out of the layers and the p-n junction 1002 returns to an unbiased electronic state. The refractive index of the p-n junction 1002 is different under the forward, reverse, and no bias.

In other embodiments, the resonant elements can be configured as memristors that can change and retain their resistance state even after the bias has been removed. Each resistance state corresponds to a different refractive index. FIG. 11A shows an isometric view of a resonant element 1100 configured with an intermediate memristors layer 1102 in accordance with embodiments of the present invention. The memristor layer 1102 includes a primary active region, or layer, 1104 and a secondary active region, or layer 1106. The primary active region 1104 comprises a thin film of a material that is electronically semiconducting or nominally electronically insulating and can also be a weakly ionic conductor. The primary active material is capable of transporting and hosting ions that act as dopants to control the flow of electrons through the resonator element 1200. The basic mode of operation is to apply a voltage bias of an appropriate magnitude and polarity across the memristor layers at the junctions. The electrical field, also called a "drift field," enables the motion of the dopants in the primary material to drift into or out of the primary material via ionic transport. The ionic species are specifically chosen from those that act as electrical dopants for the primary material, and thereby change the rectifying state of the primary active material. The memristor layer 1102 can be placed in one of the four different types of rectifying states: a forward rectifier, a reverse rectifier, a head-to-head rectifier, and a shunted rectifier, as shown in FIG. 11B. Each of the rectifying states corresponds to a different refractive index.

In addition, the primary active material and the dopants are chosen such that the drift of the dopants into or out of the primary active material is possible but not too facile in order to ensure that the memristor layer 1102 remains in a particular rectifying state for a reasonable period of time, perhaps for many years at room temperature. This ensures that the memristor layer 1102 is nonvolatile. In other words, the memristor layer 1102 holds its rectifying state (i.e., keeps memory of its resistive state) after the drift field has been removed. Applying a drift field with a large enough magnitude causes both electron current and dopant to drift, whereas applying biases with lower relative voltage magnitudes than the drift field causes negligible dopant drift enabling the element to hold its rectifying state.

On the other hand, the secondary active region 1106 comprises a thin film that is a source of dopants for the primary active material. These dopants may be impurity atoms such as hydrogen or some other cation, such as alkali or transition metals, that act as electron donors for the primary active material. Alternatively, the dopants can be anion vacancies, which in the primary active material are charged and therefore are also electron donors for the lattice. It is also possible to drive the anions into the primary active material, which then become electron acceptors or hole donors.

The primary active material can be nanocrystalline, nanoporous, or amorphous. The mobility of the dopants in such nanostructured materials is much higher than in bulk crystalline material, since diffusion can occur through grain boundaries, pores or through local structural imperfections in an amorphous material. Also, because the primary active material film is thin, the amount of time needed for dopants to diffuse into or out of region of the film to substantially change the film's conductivity is relatively rapid. For example, the time needed for a diffusive process varies as the square of the distance covered, so the time to diffuse one nanometer is one-millionth the time to diffuse one micrometer.

The primary active and secondary active regions 1104 and 1106 of the memristor layer 1102 are contacted on either side by nanowires or one of the nanowires can be composed of a semiconductor material and the other a metal. When the memristor layer 1102 is composed of semiconductor material, the contract between a metal electrode and the memristor layer 1102 depletes the memristor layer 1102 of free charge carriers. Thus, the memristor layer 1102 has a net charge that depends on the identity of the dopant which is positive in the case of electron donors and negative in the case of electron acceptors.

Switching from one rectifying state to another can be accomplished by applying an electric field of an appropriate magnitude and polarity across the memristor layer 1102. The electric field forces the dopants to drift into or out of the electrode/active region interface regions thus changing the rectifying state of the memristor layer 1102. For example, as shown in FIG. 11B, an appropriate electric field can be used to force dopants located near the interfaces of the shunted rectifier to move to one of the interfaces thus changing the shunted rectifier into either the forward rectifier or the reverse rectifier.

The ability of the charged species to diffuse into and out of the primary active material is substantially improved if one of the interfaces connecting the memristor layer 1102 to a metal or semiconductor electrode is non-covalently bonded. Such an interface may be caused by a void in the material or it may be the result of an interface that contains a material that does not form covalent bonds with the electrode, the primary active material, or both. This non-covalently bonded interface lowers the activation energy of the atomic rearrangements that are needed for drift of the dopants in the primary active material. This interface is essentially an extremely thin insulator, and adds very little to the total series resistance of the element.

The primary and secondary active materials of the memristor layer 1102 can be oxides, sulfides, selenides, nitrides, phosphides, arsenides, chlorides, hydrides, and bromides of the transition and rare earth metals, with or without the alkaline earth metals being present. In addition, there are various alloys of these compounds with each other, which can have a wide range of compositions if they are mutually soluble in each other. In addition, the memristor layer 1102 can be composed of mixed compounds, in which there are two or more metal atoms combined with some number of electronegative elements. The dopants can be anion vacancies or different valence elements doped in the memristor layer 1102. One combination of materials is a primary active material that is undoped and stoichiometric, and thus a good insulator, combined with a secondary source/sink of the same or related parent material that either contains a large concentration of anion vacancies or other dopants that can drift into the primary material under the application of an appropriate bias.

The memristor layer 1102 can be composed of oxides that contain at least one oxygen atom (O) and at least one other element. In particular, the memristor layer 1102 can be composed of silica ($SiO_2$), titania ($TiO_2$), nickel-oxide (NiO), zirconia ($ZrO_2$), and hafnia ($HfO_2$) with or without 3d impurities (e.g., Cr, Mn), or sp-impurities (e.g., Li, Be, Ca). These materials are compatible with silicon (Si) integrated circuit technology because they do not create doping in the Si. Other embodiments for the memristor layer 1102 include alloys of these oxides in pairs or with all three of the elements Ti, Zr, and Hf present. For example, the memristor layer 1102 can be composed of $Ti_xZr_yHf_zO_2$, where $x+y+z=1$. Related compounds include titanates, zirconates, and hafnates. For example, titanates includes $ATiO_3$, where A represents one of the divalent elements strontium (Sr), barium (Ba) calcium (Ca), magnesium (Mg), zinc (Zn), and cadmium (Cd). In general, the memristor layer 1102 can be composed of $ABO_3$, where A represents a divalent element (e.g., $Sr^{++}$, $Ba^{++}$) and B represents $Ti^{4+}$, $Zr^{4+}$, and $Hf^{4+}$. The memristor layer 1102 can also be composed of alloys of these various compounds, such as $Ca_aSr_bBa_cTi_xZr_yHf_zO_3$, where $a+b+c=1$ and $x+y+z=1$. There are also a wide variety of other oxides of the transition and rare earth metals with different valences that may be used, both individually and as more complex compounds. In each case, the mobile dopant can be an oxygen vacancy or an aliovalent element doped into the memristor layer 1102. The oxygen vacancies effectively act as dopants with one shallow and one deep energy level. Because even a relatively minor nonstoichiometry of about 0.1% oxygen vacancies in $TiO_{2-x}$ is approximately equivalent to $10^{20}$ dopants/$cm^3$, modulating oxygen vacancy profiles have strong effect on electron transport.

In other embodiments, the memristor layer 1102 can be a sulfide or a selenide of the transition metals with some ionic bonding character, essentially the sulfide and selenide analogues of the oxides described above.

In other embodiments, the memristor layer 1102 can be a semiconducting nitride or a semiconducting halide. For example, semiconducting nitrides include AlN, GaN, ScN, YN, LaN, rare earth nitrides, and alloys of these compounds and more complex mixed metal nitrides, and semiconducting halides include CuCl, CuBr, and AgCl. The memristor layer 1102 can be a phosphide or an arsenide of various transition and rare earth metals. In all of these compounds, the mobile dopant can be an anion vacancy or an aliovalent element.

A variety of dopants can be used and are selected from a group consisting of hydrogen, alkali, and alkaline earth cations, transition metal cations, rare earth cations, oxygen anions or vacancies, nitrogen anions or vacancies, pnictide anions or vacancies, or halide anions or vacancies. Other suitable materials include metal hydrides, such as $Mg_2NiH_4$, $Mg_2MnH_7$, $Mg_6Co_2H_{11}$, $Mg_2CoH_5$, $Mg_2CoH_5$, and $Mg_2FeH_6$, and copper oxides, such as $Cu_2O$ and $CuO$, exhibit large changes in refractive indices.

Dynamically Reconfigurable Holograms

Figure 12:
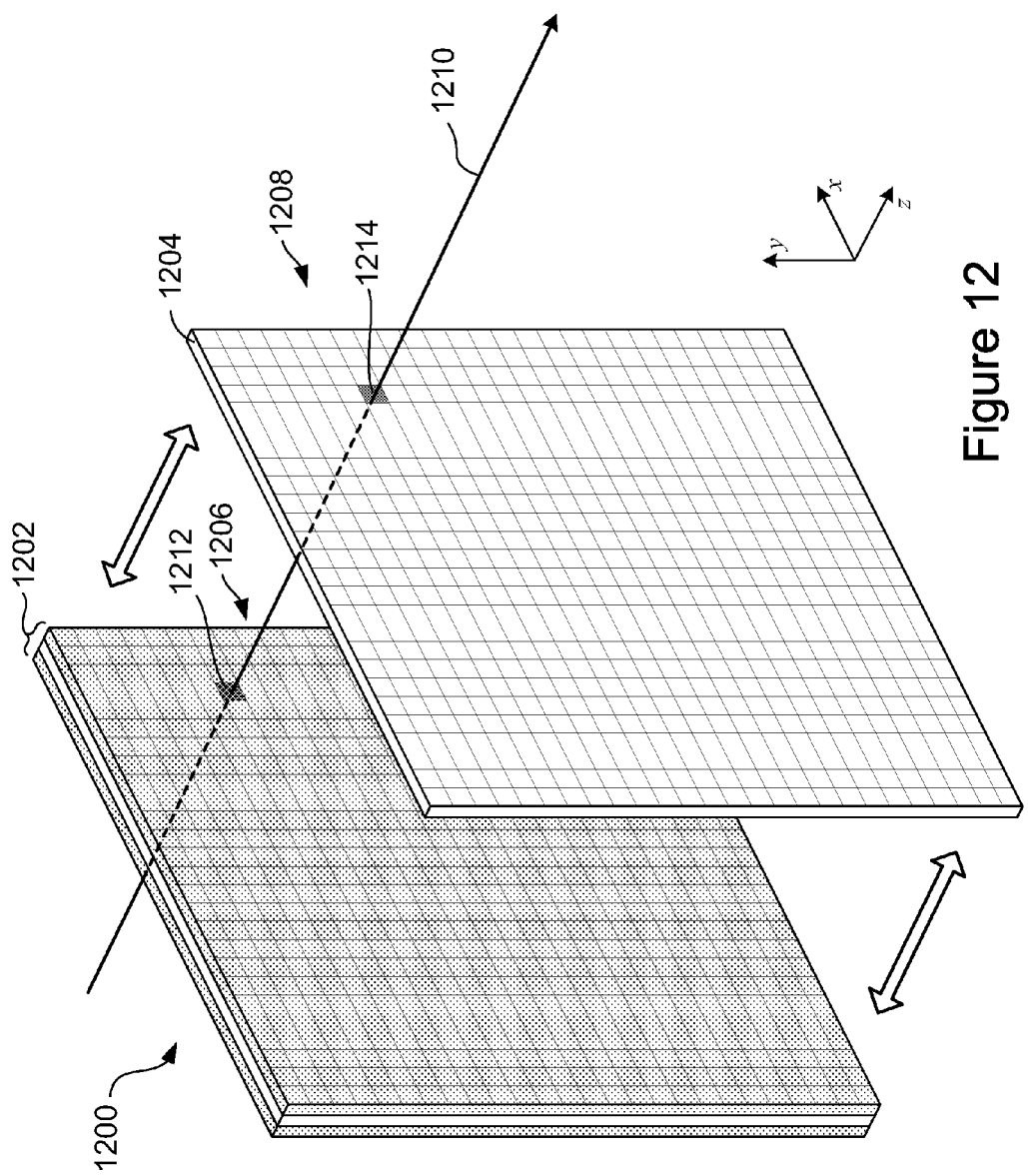
FIG. 12 shows an exploded isometric view of an electronically addressable dynamic hologram configured in accordance with embodiments of the present invention.

FIG. 12 shows an exploded isometric view of an electronically addressable and dynamically reconfigurable hologram 1200 configured in accordance with embodiments of the present invention. The hologram 1200 includes a phase-control layer 1202 and an intensity-control layer 1204. As shown in the example of FIG. 12, the surface 1206 of phase-control layer 1202 and the surface 1208 of intensity-control layer 1204 include grid lines that outline two different two-dimensional arrays of squares. Each square represents a pixel, and each pixel of phase-control layer 1202 is substantially aligned with each pixel of intensity-control layer 1204. The pixels in phase-control layer 1202 are referred to as "phase-modulation pixels" and the pixels in intensity-control layer 1204 are referred to as "intensity-control pixels." For example, as shown in FIG. 12, directional arrow 1210 passes through a highlighted first phase-modulation pixel 1212 located in phase-control layer 1202 and passes through a second highlighted intensity-control pixel 1214 located in intensity-control layer 1204.

The phase-control layer 1202 is a resonant plasmonic metamaterial that can be operated to exhibit negative refraction for particular wavelengths of light. The resonant behavior translates into large phase changes of refracted light. The refractive index of each phase-modulation pixel in phase-control layer 1202 can be independently and electronically controlled, and the transparency of each intensity-control pixel in intensity-control layer 1204 can also be independently and electronically controlled. In other words, the phase-modulation pixels and the intensity-control pixels are "electronically addressable." For a ray of light passing through any pair of aligned phase-modulation and intensity-control pixels, a transmission phase can be applied to the ray by the phase-modulation modulation pixel in phase-control layer 1202 followed by a reduction in the intensity produced by the corresponding intensity-control pixel in the intensity-control layer 1204. For example, suppose directional arrow 1210 represents a ray of light originating from a light source (not shown) located behind phase-control layer 1202. As the ray passes through the phase-modulation pixel 1212, a first voltage applied to the pixel 1212 induces a change in the refractive index of the pixel 1212. As a result, the ray 1210 acquires a transmission phase as it emerges from the pixel 1212, and it may also exhibit an intensity decrease due to insertion loss. As the ray subsequently passes through intensity-control pixel 1214, a second voltage applied to the pixel 1214 changes the transparency of the pixel 1214 and, thus, adjusts the intensity of the ray as it emerges from the intensity-control layer 1204 to render a holographic image by taking into account any optical insertion losses. In other words, the phase-control layer 1202 and the intensity-control layer 1204 can be operated in conjunction to produce both transmission phases and intensity variations in light transmitted through individual pixels of the phase-control layer 1202 and the intensity-control layer 1204. As a result, three-dimensional images can be produced by the collective optical effect of controlling the wavefront and the intensity of light emerging from the hologram 1200. Because the effective refractive index and the intensity of each pixel can be separately and electronically controlled, three-dimensional motion pictures can be produced. A more detailed description of the operation of the hologram 1200 is described below.

Embodiments of the present invention are not limited to a one-to-one correspondence between phase-modulation pixels and intensity-control pixels. In other embodiments, the phase-modulation pixels and intensity-control pixels can be arranged and configured so that light is transmitted through one or more phase-modulation pixels and subsequently is transmitted through one or more intensity-control pixels.

Figure 13:
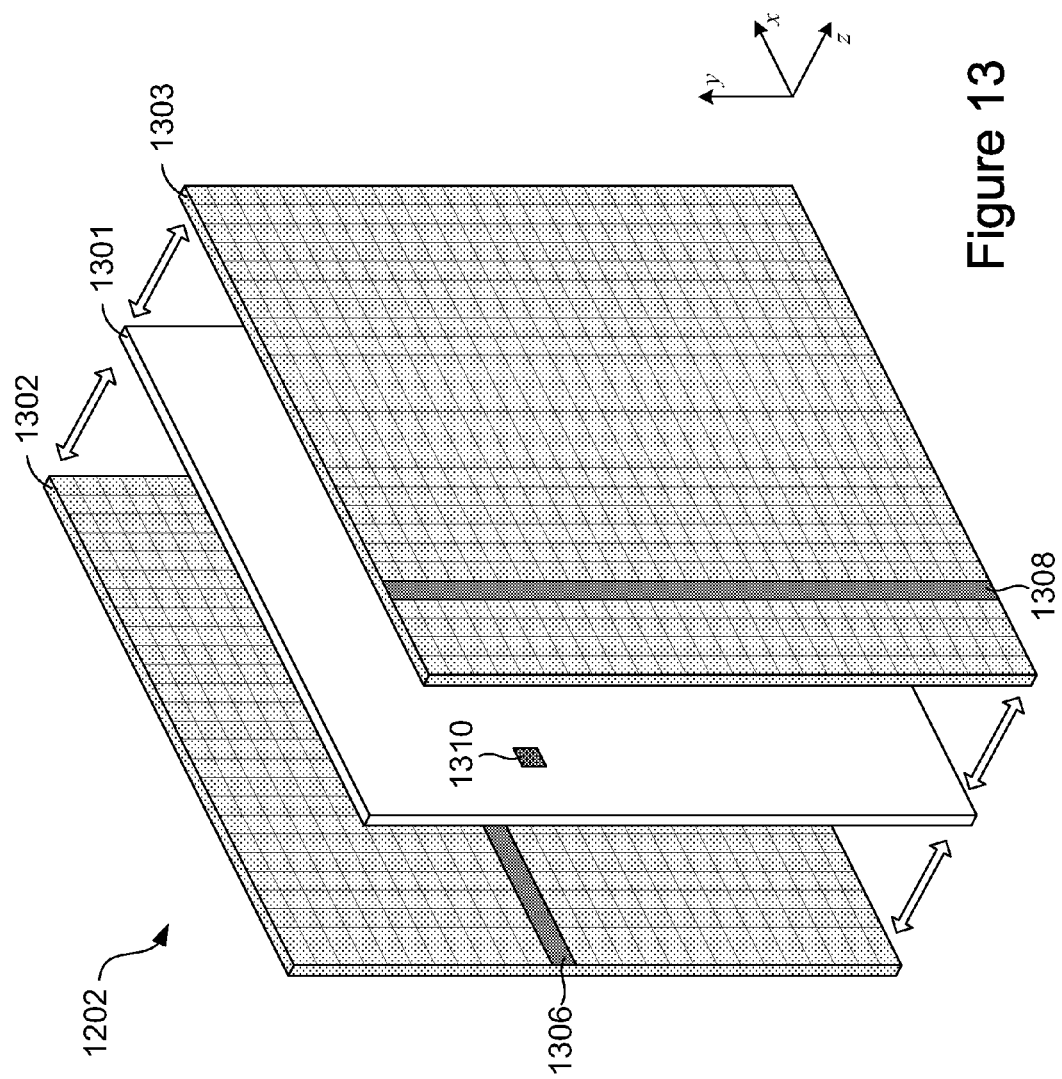
FIG. 13 shows an exploded isometric view of a phase-control layer configured in accordance with embodiments of the present invention.

FIG. 13 shows an exploded isometric view of the phase-control layer 1202 configured in accordance with embodiments of the present invention. As shown in FIG. 13, the phase-control layer 1202 comprises an intermediate phase-modulation layer 1301 sandwiched between two outer conductive layers 1302 and 1303. Each phase-modulation pixel is electronically addressed as follows. The conductive layers 1302 and 1303 are configured so that voltages can be applied to substantially orthogonal overlapping strips or bands of the conductive layers 1302 and 1303. Each intersection of overlapping strips in layers 1302 and 1303 corresponds to a phase-modulation pixel in the phase-control layer 1202. For example, as shown in FIG. 13, applying an appropriate voltage or current to a first strip 1306 of conductive layer 1302 running substantially parallel to the x-axis and simultaneously applying an appropriate voltage or current to a second strip 1308 of conductive layer 1303 running substantially parallel to the y-axis produces a voltage across a region 1310 of layer 1301 between the overlapping strips 1306 and 1308. As a result, the refractive index of the region 1310 is changed. The degree to which the refractive index is changed can vary depending on the magnitude of the voltage difference created across the region 1310. Thus, a phase-modulation pixel in the phase-control layer 1202 includes a region of phase-modulation layer 1301 sandwiched between substantially orthogonal, overlapping strips of conductive layers 1302 and 1303, and the refractive index of the phase-modulation pixel is controlled by applying appropriate voltages to the overlapping strips.

Figure 14:
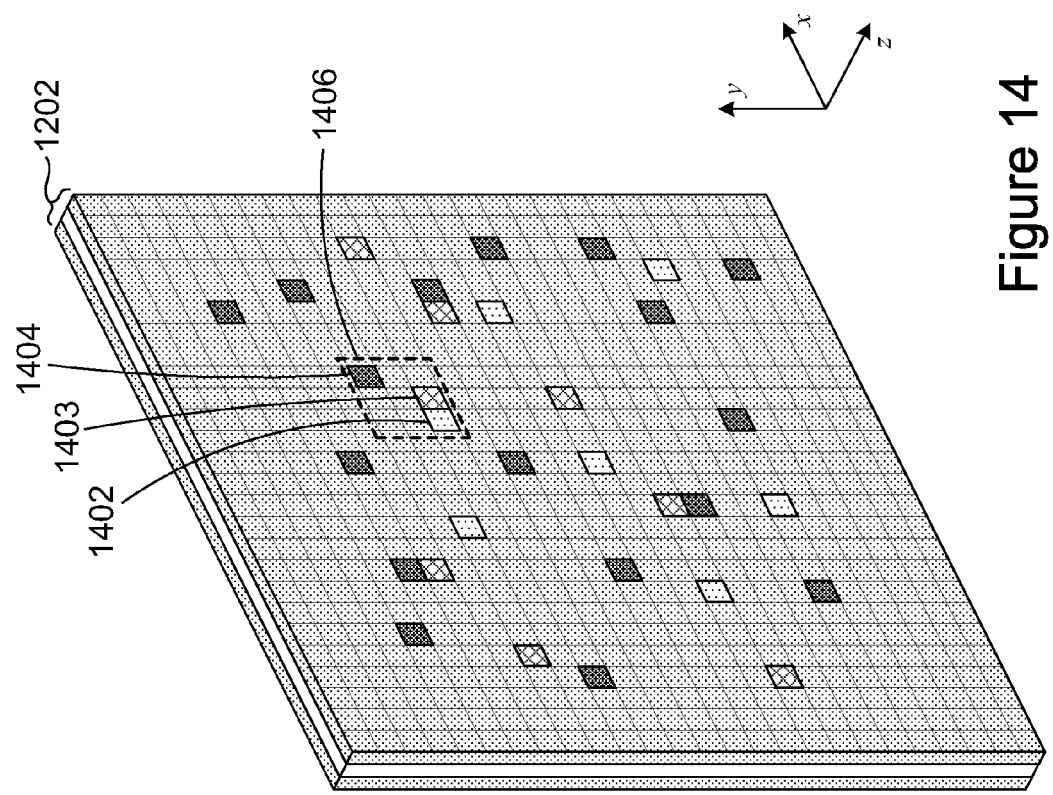
FIG. 14 shows a number of highlighted phase-modulation pixels associated with different refractive indices in accordance with embodiments of the present invention.

The refractive index of each pixel can be varied by applying a different voltage to each pixel. FIG. 14 shows a number of highlighted phase-modulation pixels having different refractive indices in accordance with embodiments of the present invention. Each pixel is electronically addressable as described above with reference to FIG. 13, and depending on the magnitude of the voltage applied to each pixel, the effective refractive index of each pixel can be separately adjusted. For example, shaded pixels 1402-1404 each represent pixels having different effective refractive indices which result from applying different voltages to each of the pixels 1402-1404. The change in the effective refractive index can range from a few percent to approximately 10%, but coupled with a resonant negative pixel, the change in the effective refractive index is larger.

The phase-control layer 1202 can be composed of a crossbar NIM, and each electronically addressable phase-modulation pixel can be composed of one or more resonant elements. FIG. 15 shows an isometric view and an enlargement of a region 1502 of the phase-control layer 1202 shown in FIG. 12 in accordance with embodiments of the present invention. The enlarged region 1502 reveals that the phase-control layer 1202 is implemented as a crossbar NIM comprising an intermediate layer sandwiched between a first layer of substantially parallel nanowires 1504 and a second layer of approximately parallel nanowires 1506, where the nanowires in the first layer 1504 are approximately perpendicular to the nanowires in the second layer 1506. The crossbar NIM and resonant elements are configured and operated as described above with reference to the subsections Negative Index Material Crossbars and Resonant Elements.

FIG. 16 shows an isometric view and enlargement of a region 1406 of the phase-control layer 1202 shown in FIG. 14 in accordance with embodiments of the present invention. The pixels 1402-1404 of FIG. 14 are enlarged and identified in FIG. 16 by dashed-line enclosures. The pixels 1402-1404 are each composed of a square array of 9 resonant elements. A change in the refractive index of a pixel is the result of changes in the refractive indices of the resonant elements comprising the pixel. As described above in the subsections Negative Index Material Crossbars and Resonant Elements, a refractive index change of a resonant element can be the result of changes in an oxidation or redox state, resistivity, variation in ion concentration, injection of charge carriers under a forward or reverse bias, or any other source of refractive index change. A change in the refractive index of a resonant element depends on the chemical composition of the intermediate layer of the resonant element and on the magnitude and polarity of the voltage applied to the resonant element. As shown in FIG. 16, the individual nanowires of the pixels 1402-1404 are electronically coupled to voltage sources so that the resonant elements of each pixel can be individually and electronically addressed. In order to change the refractive index of the resonant elements comprising the pixel 1402, the nanowires of the pixel 1402 are electronically addressed by applying the same voltage $V_3$ to the nanowires 1601-1603 and a different voltage $V_4$ to all three of the nanowires 1604-1606 resulting in applying the same voltage across each of the nine resonant elements comprising the pixel 1402. As a result, the refractive indices of the individual resonant elements comprising the pixel 1402 are changed to the same refractive index, and light transmitted through the pixel 1402 acquires a transmission phase shift in accordance with the refractive index of the resonant elements comprising the pixel 1402. For example, the refractive index of the nine resonant elements comprising the pixel 1402 can be shifted as described above with reference to plot 902 of FIG. 9. The pixels 1403 and 1404 are also separately and electronically addressed by applying different sets of voltages to the nanowires comprising the pixels 1403 and 1404 to produce different refractive indices associated with each pixel.

FIG. 17A show cross-sectional view along a line 17A-17A, shown in FIG. 16, of the pixel 1402 operated in accordance with embodiments of the present invention. Shaded resonant elements 1702-1704 represent three of the nine resonant elements comprising the pixel 1402. FIG. 17B show cross-sectional view along a line 17B-17B, shown in FIG. 16, of the pixel 1403 operated in accordance with embodiments of the present invention. Shaded resonant elements 1706-1708 represent three of the nine resonant elements comprising the pixel 1403. FIG. 17C show cross-sectional view along a line 17C-17C, shown in FIG. 16, of the pixel 1404 operated in accordance with embodiments of the present invention. Shaded resonant elements 1710-1712 represent three of the nine resonant elements comprising the pixel 1404.

Embodiments of the present invention are not limited to pixels comprising a square array of nine resonant elements. Because voltages can be applied to individual crossed nanowires, the number of square array resonant elements comprising a single pixel can range from as few as 4 to hundreds or even thousands of resonant elements. In addition, the individual nanowires enable pixels to have various shapes such as square, rectangular, circular, elliptical, triangular, or any other suitable shape.

Figure 18:
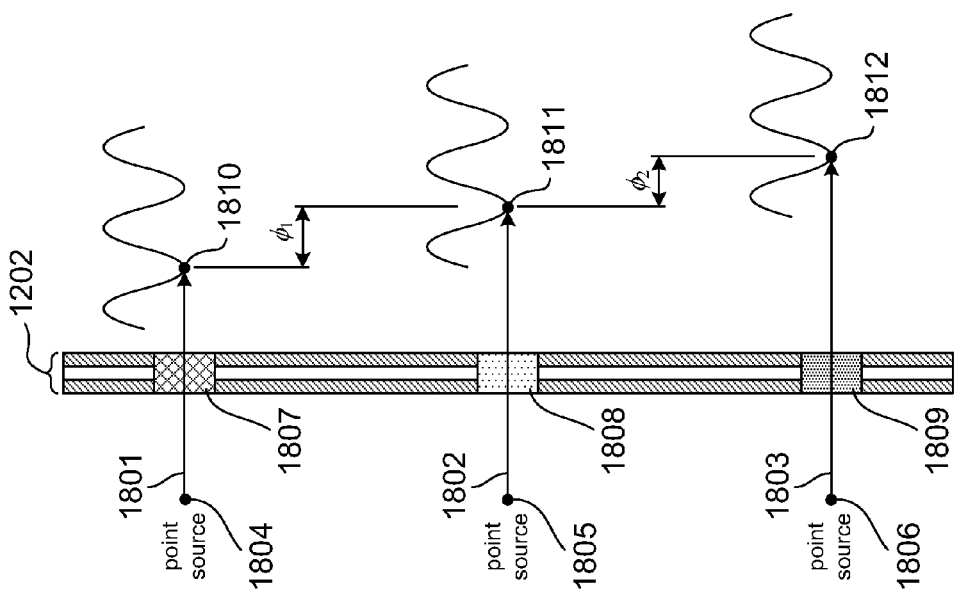
FIG. 18 shows a side view of rays of light passing through three pixels of a phase-control layer operated in accordance with embodiments of the present invention.

FIG. 18 shows a side view of rays of light transmitted through three pixels of the phase-control layer 1202 operated in accordance with embodiments of the present invention. Rays of light 1801-1803 emanating from point sources 1804-1806 pass through pixels 1807-1809, respectively. In the example shown in FIG. 18, each pixel is electronically addressed, as described above with reference to FIG. 16, and has a different refractive index with pixel 1807 having the largest refractive index, pixel 1808 having the second largest refractive index, and pixel 1809 having the smallest refractive index. As rays 1801-1803 enter associated pixels 1807-1809, the light slows to a velocity v=c/n where v is the velocity of light propagating through a pixel, c is the speed of light in free space, and n is the refractive index of the pixel. Thus, the ray 1804 passing through the pixel 1807 has the slowest velocity, the ray 1805 passing through the pixel 1808 has the second slowest velocity, and the ray 1806 has the highest relative velocity. As shown in FIG. 18, points 1810-1812 represent points on electromagnetic waves that simultaneously enter the pixels 1807-1809, respectively, but due to the different refractive indices at each pixel, the points 1810-1812 of the electromagnetic waves emerge at different times from the pixels 1807-1809 and, therefore, are located at different distances from the phase-control layer 1202. In other words, the electromagnetic waves emerging from the pixels 1807-1809 acquire transmission phase shifts. As shown in FIG. 18, the relative phase difference between the electromagnetic waves emerging from pixels 1807 and 1808 is $\phi_1$, and the relative phase difference between electromagnetic waves emerging from pixels 1808 and 1809 is $\phi_2$, with the greatest relative phase difference of $\phi_1+\phi_2$ for electromagnetic waves emerging from pixels 1807 and 1809. The voltage applied to the pixels 1807-1809 can be rapidly modulated, which, in turn, rapidly modulates the refractive indices of the pixels 1807-1809 resulting in rapid changes in relative phase differences between rays emerging from the pixels 1807-1809.

Figure 19:
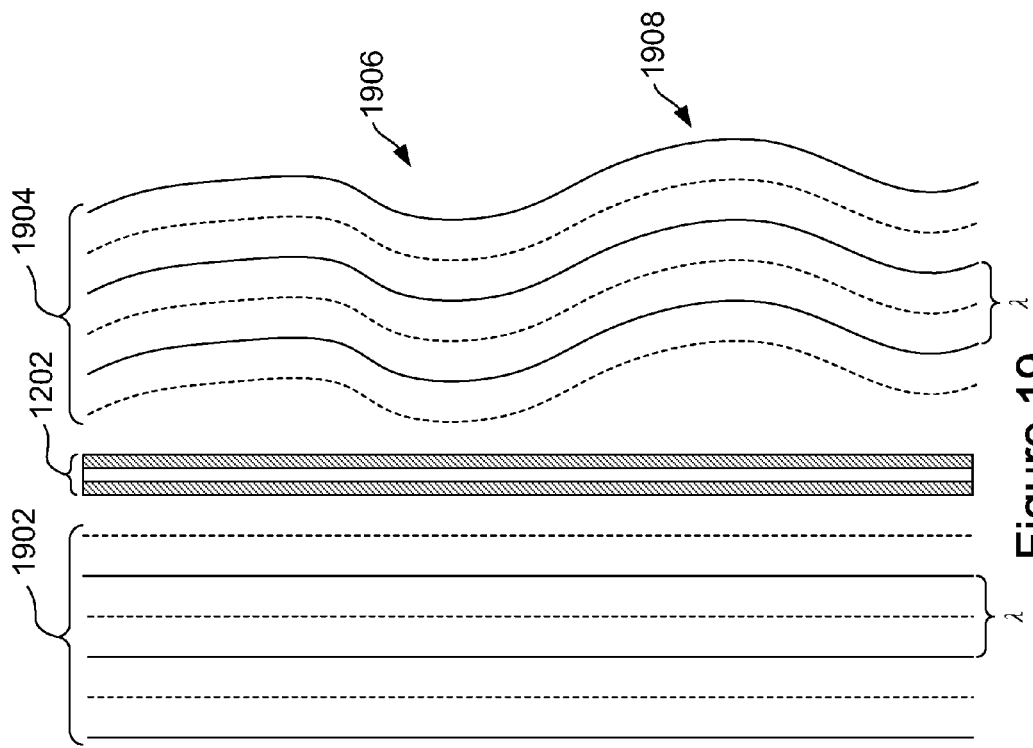
FIG. 19 shows a side view of quasimonochromatic light wavefront passing through a phase-control layer in accordance with embodiments of the present invention.

FIG. 19 shows a side view of quasimonochromatic light entering and emerging from the phase-control layer 1202 in accordance with embodiments of the present invention. Ideally monochromatic light is used. However, in practice it is recognized that a light source does not emit monochromatic light but instead can emit light in a narrow band of wavelengths, which is called "quasimonochomatic light." Quasimonochromatic light enters the phase-control layer 1202 with uniform wavefronts 1902 of wavelength λ. Each wavefront crest is identified by a solid line and each wavefront trough is identified by a dashed line. As shown in FIG. 19, each wavefront enters the phase-control layer 1202 with substantially the same phase. The pixels (not identified) of the phase-control layer 1202 are selectively addressed to produce non-uniform wavefronts 1904 by affecting the phase of different portions of the non-uniform wavefront 1904. The non-uniform wavefronts 1904 can result from certain portions of the incident uniform wavefronts 1902 passing through pixels that have been electronically configured with relatively different refractive index magnitudes. For example, portions of non-uniform wavefronts in region 1906 emerge from the phase-control layer 1202 later than portions of non-uniform wavefronts in region 1908. In other words, the phase-control layer 1202 is configured to introduce relatively large transmission phase differences between portions of wavefronts emerging in region 1906 and portions of wavefronts emerging in region 1908. The non-uniform wavefront 1904 contains substantially all the information needed to reproduce a wavefronts reflected from an object when viewed over a particular range of viewing angles.

Light emerging from phase-modulation pixels of the phase-control layer 1202 pass through corresponding intensity-control pixels of intensity-control layer 1204, as described above with reference to FIG. 12. Each intensity-control pixel can be filled with a liquid crystal. In certain embodiments, the intensity-control layer 1204 can be a liquid crystal layer. Each intensity-control pixel of intensity-control layer 1204 typically consists of a layer of liquid crystal molecules aligned between two transparent electrodes, and two polarizing filters with substantially perpendicular axes of transmission. The electrodes are composed of a transparent conductor such as Indium Tin Oxide ("ITO"). Thus, with no liquid crystal filling the pixel between the polarizing filters, light passing through the first filter is blocked by the second filter. The surfaces of the transparent electrodes contacting the liquid crystal material are treated with a thin polymer molecule that aligns the liquid crystal molecules in a particular direction.

Before applying an electric field to a pixel, the orientation of the liquid crystal molecules is determined by the alignment at the polymer deposited on surfaces of the transparent electrode. An intensity-control pixel comprising twisted nematic liquid crystals, the surface alignment direction of the polymer on the first electrode is substantially perpendicular to the alignment direction of the polymer on the second electrode, and the liquid crystal molecules between the electrodes arrange themselves in a helical structure. Because the liquid crystal is birefringent, light passing through one polarizing filter is rotated by the liquid crystal helix allowing the light to pass through the second polarized filter.

When a voltage is applied across the electrodes of an intensity-control pixel, a torque is created that aligns the liquid crystal molecules parallel to the electric field, distorting the helical structure. This reduces the rotation of the polarization of the incident light, and the pixel appears grey. When the applied voltage is large enough, the liquid crystal molecules are almost completely untwisted and aligned with the electric field, and the polarization of the incident light is not rotated as it passes through the liquid crystals. This light will then be mainly polarized perpendicular to the second filter, and as a result, the light is blocked by the second filter and the pixel appears black. By controlling the voltage applied to each intensity-control pixel, the intensity of light passing through each intensity-control pixel can be varied thus constituting different levels of grey.

Figure 20:
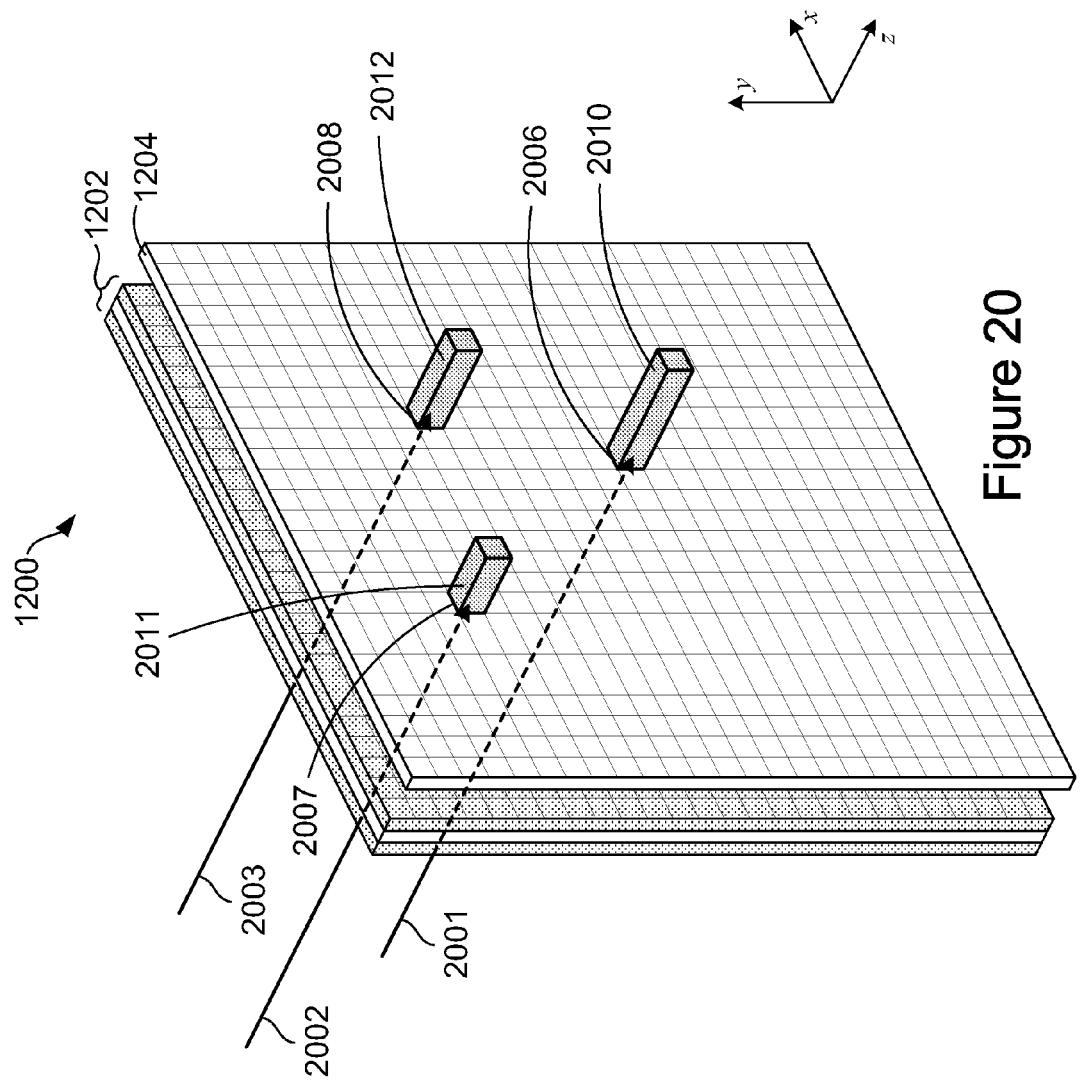
FIG. 20 shows intensity levels associated with rays passing through pixels of a phase-modulation layer and an intensity-control layer in accordance with embodiments of the present invention.

FIG. 20 shows intensity levels associated with rays 2001-2003 passing through pixels of phase-control layer 1202 and intensity-control layer 1204 in accordance with embodiments of the present invention. The rays emerging from phase-modulation pixels in phase-control layer 1202 pass through intensity-control pixels 2006-2008 that are each configured to produce a different intensity level. As shown in FIG. 20, bars 2010-2012 represent intensity levels of light emerging from intensity-control pixels 2006-2008. The length of bar 2011 is shorter than the length of bar 2010 representing the relatively lower intensity level of light emerging from pixel 2007 than from pixel 2006. The intensity level of light emerging from an intensity-control pixel is selectively determined by the magnitude of the voltage applied to the pixel. For example, a relatively higher voltage applied to pixel 2007 than to pixel 2006 results in a relatively lower intensity level for light emerging from pixel 2007 than for light emerging from pixel 2006.

In other embodiments, color filters can be placed over each intensity-control pixel so that colored light emerges from each intensity-control pixel. For example, three adjacent intensity-control pixels can be combined to form an RGB color pixel. Red, green, and blue primary color filters can be placed over each of three adjacent intensity-control pixels. A red filter can be placed over a first pixel, a blue filter can be placed over a second pixel, and a green filter can be placed over a third pixel. Light of varying colors can be generated by varying the intensity of light passing through each of the three pixels of the RGB pixel. In other embodiments, different colors can be used for the three intensity-control pixels comprising the color pixel. For example, cyan, magenta, and yellow filters can placed over each of three adjacent intensity-control pixels. Note that since the intensity-control pixels are configured with subwavelength dimensions, in other embodiments groups of pixels can be configured such that each of the group of pixels respond to different quasimonochromatic light such as red, green and blue light. The group of pixels can have subwavelength dimensions and dynamically generate a color hologram.

Figure 21:
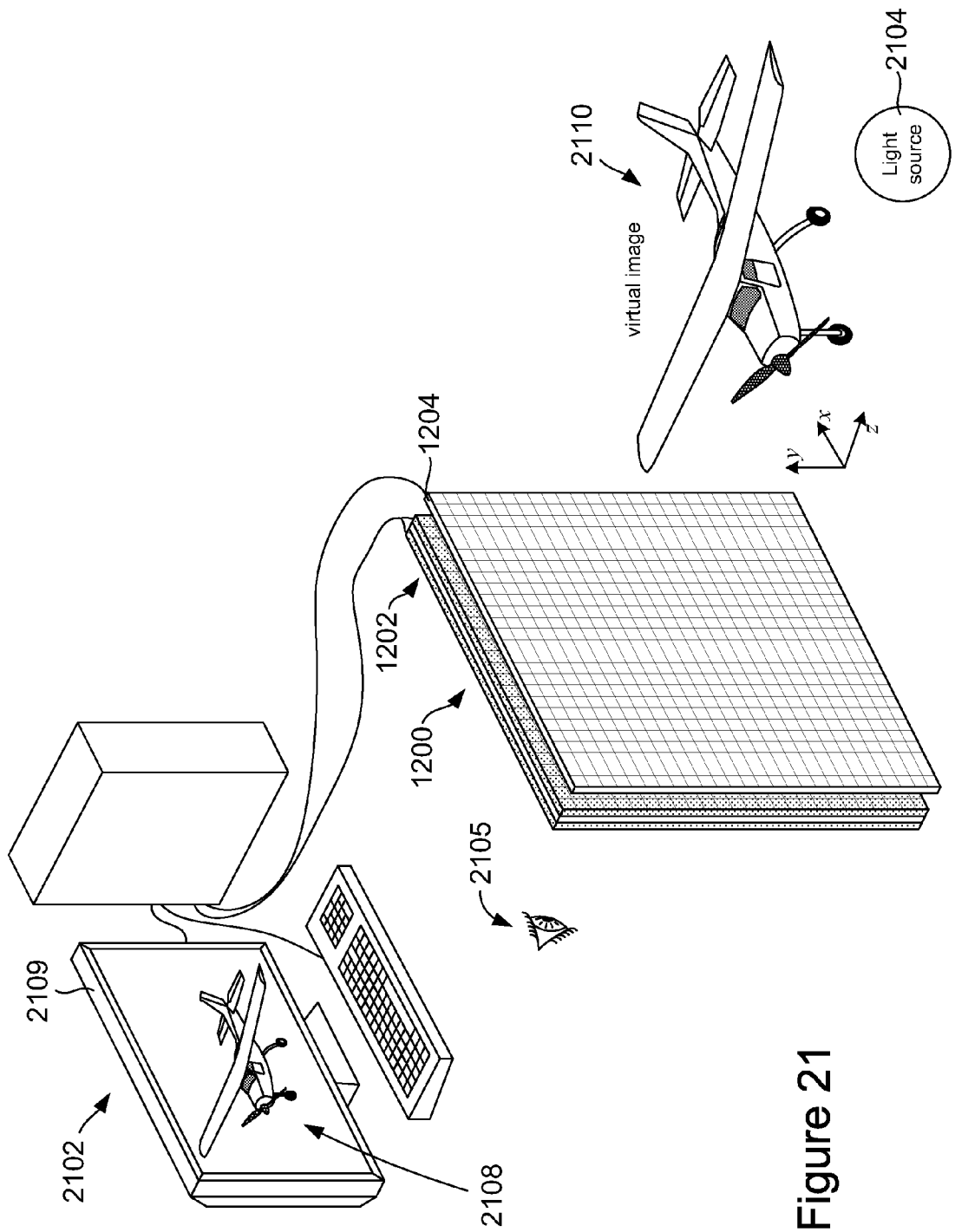
FIG. 21 shows a system for generating three-dimensional images in accordance with embodiments of the present invention.

FIG. 21 shows a system for generating three-dimensional images in accordance with embodiments of the present invention. The system comprises a computer system 2102, an electronically addressable dynamic hologram 1200, and a light source 2104. The computer system 2102 includes a processor and memory that processes and stores the data representing various images of objects and scenes. The images are stored in the memory as data files comprising three-dimensional coordinates and associated intensity and color values. A three-dimensional image of an object can be displayed on one side of the hologram 1200 as follows. The light source 2104 is positioned and configured to emit quasimonochromatic light that passes through the layers 1202 and 1204 of the hologram 1200. A program stored on the computer system memory displays the image as a three-dimension object by translating the data files into electronic addresses that are applied to particular phase-modulation pixels in phase-control layer 1202 and intensity-control pixels in intensity-control layer 1204. Light passing through each phase-modulation pixel acquires an appropriate transmission phase and passing through each intensity-control pixel acquires an intensity level adjustment in order to reproduce the wave field reflected by the object over a range of viewing angles. As a result, the image stored in the computer is perceived by a viewer 2105 as a three-dimensional object suspended behind the hologram 1200. The image observed by the viewer is called a "virtual image." For example, as shown in FIG. 21, the computer system 2102 displays a two-dimensional image of an airplane 2108 on a monitor 2109 and displays a three-dimensional virtual image 2110 of the same airplane on the side of the hologram 1200 opposite the viewer 2105. A viewer 2105 looking at the hologram 1200 sees the airplane 2110 in depth by varying the position of her head or changing her perspective of the view.

Figure 22A:
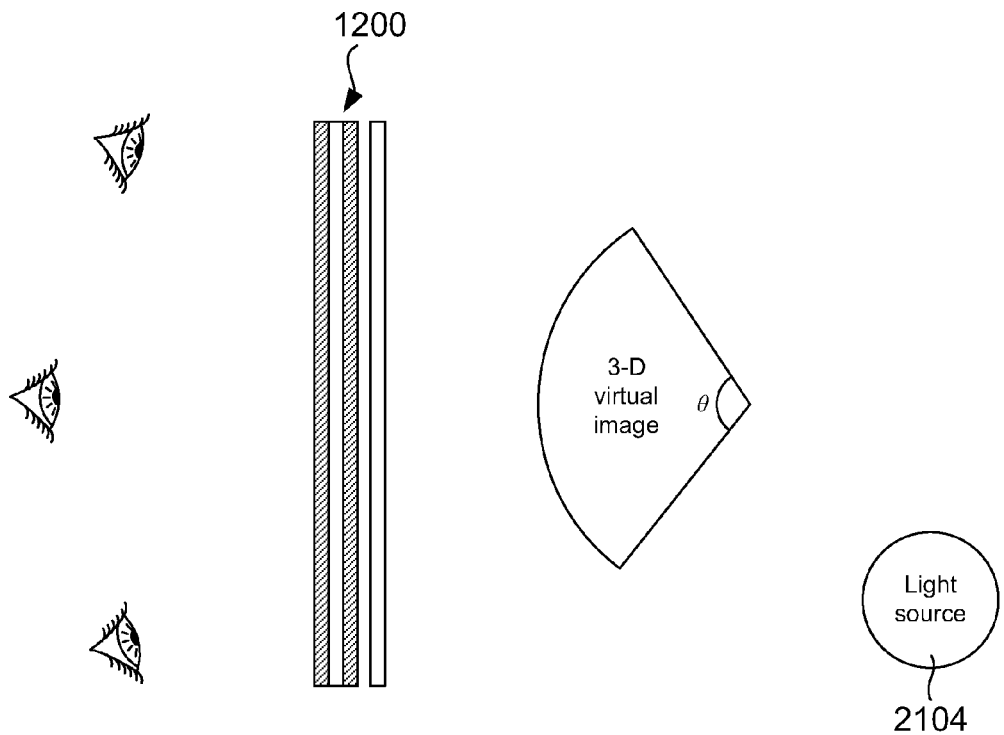
FIGS. 22A-22B show a schematic representation of a hologram displaying three different three-dimensional images in accordance with embodiments of the present invention.

FIG. 22A shows a schematic representation of a viewing angle over which a viewer can view a three-dimensional virtual image with the hologram 1200 in accordance with embodiments of the present invention. A viewer looks through the hologram 1200 and sees a three-dimensional virtual image in depth, and by varying the viewer's viewing position within the viewing angle θ, the viewer can change the perspective of the view. Because each phase-modulation pixel and intensity-control pixel is electronically addressable and the refractive index of each pixel can be rapidly changed, moving virtual images, such as motion pictures, of three-dimensional objects and scenes can be displayed.

Figure 22B:
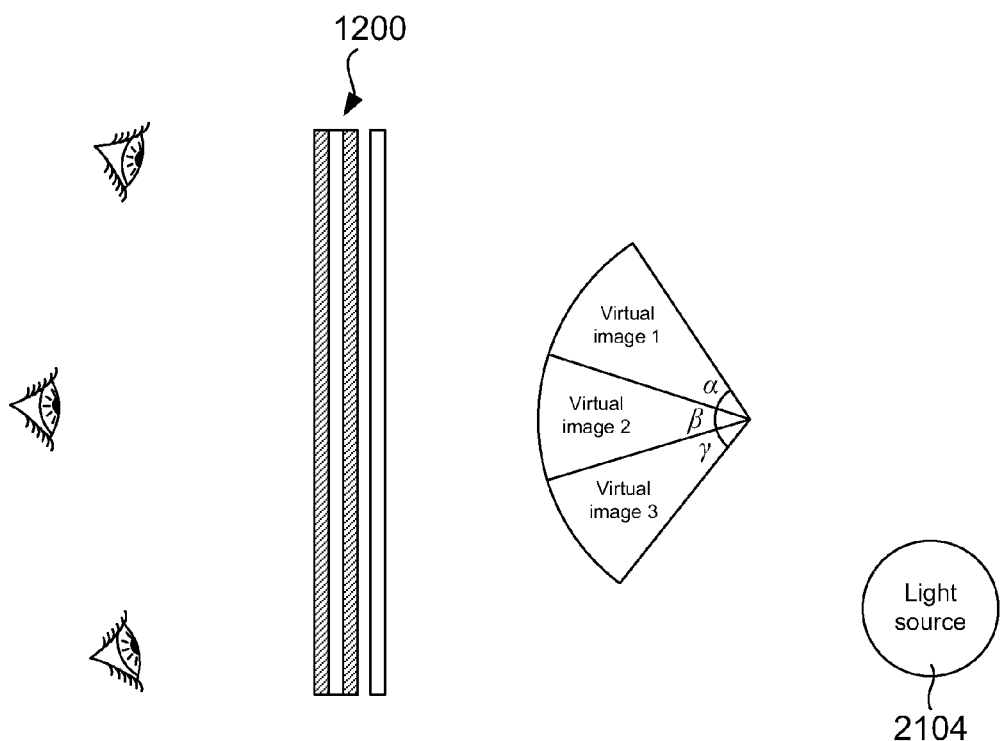

Operation of the hologram 1200 is not limited to producing a single three-dimensional image. In other embodiments, the hologram 1200 can be used to simultaneously produce one or more images, where each image can be viewed over a different range of viewing angles. FIG. 22B shows a schematic representation of the hologram 1200 displaying three different three-dimensional virtual images in accordance with embodiments of the present invention. The pixels of the hologram 1200 are individually and electronically addressed to produce interfering wavefronts producing three separate and distinct three-dimensional virtual images that can each be viewed over different viewing angles. For example, as shown in FIG. 22B, the three-dimensional virtual images 1-3 can each be viewed over different viewing angles α, β, and γ, respectively. A viewer can view the three-dimensional virtual image 1 over the range of viewing angles α. As the viewer changes position to view the three-dimensional virtual image 1 over the range of viewing angles β, the three-dimensional virtual image 1 appears to morph into the three-dimensional virtual image 2.

Although the present invention has been described in terms of particular embodiments, it is not intended that the invention be limited to these embodiments. Modifications will be apparent to those skilled in the art. For example, embodiments of the present invention are not limited to the light source 2104 being positioned on the side of the hologram 1200 opposite the image. In other embodiments, the hologram 1200 can be operated in a reflective mode where the light source 2104 can be positioned and configured to emit quasimonochromatic light reflected off of pixels of the layers 1202 of the hologram 1200 creating an image on the opposite side of the light source 2104. In other embodiments, more than one phase-control layer can be included to control the phase and more than one intensity-control layer can be included to control the intensity. In addition, when the resonant elements of the phase-control layer 1202 comprise memristors, as described above with reference to FIGS. 9-10, the relative phase differences of the last image displayed are stored in the resistance states of the memristor layers. Thus, the last image viewed can be displayed by simply turning on the light source 2104 and the intensity-control layer 1204 without having to electronically configure the phase-modulation pixels of the phase-control layer 1202. Embodiments of the present invention are not limited to light first passing through the phase-control layer 1202 followed by light passing through the intensity-control layer 1204. In other embodiments, a hologram can be configured and operated in accordance with embodiments of the present invention where light first passes through the intensity-control layer 1204 and then passes through the phase-control layer 1202.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purposes of illustration and description. They are not intended to be exhaustive of or to limit the invention to the precise forms disclosed. Obviously, many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A negative index material crossbar comprising:
a first layer of approximately parallel nanowires, each nanowire of the first layer having substantially regularly spaced fingers;
a second layer of approximately parallel nanowires that overlay the nanowires in the first layer, each nanowire of the second layer having substantially regularly spaced fingers, wherein the nanowires in the first layer are approximately perpendicular in orientation to the nanowires in the second layer; and
resonant elements at nanowire intersections, wherein each resonant element includes two fingers of a nanowire in the first layer and two fingers of a nanowire in the second layer,
wherein a finger comprises a protuberance extending from a side of a nanowire, the fingers being separated by notches.

2. The crossbar of claim 1 wherein the resonant elements further comprise an intermediate layer configured as one of:
resistors;
semiconductor p-n junctions; and
nonvolatile memristors.

3. The crossbar of claim 2 wherein the nonvolatile memristor further comprises:
at least one primary active region comprising at least one material for transporting a dopant species that controls the flow of charge carriers through the memristor; and
a secondary active region comprising at least one material for providing a source/sink of the dopant species for the at least one primary active region.

4. The crossbar of claim 1 wherein:
fingers of adjacent nanowires within a same layer are substantially aligned with one another;
notches between fingers of nanowires in the first layer are substantially aligned with notches between fingers of the nanowires in the second layer; and
cross-sectional dimensions of the nanowires in the first layer are relatively larger than cross-sectional dimensions of the nanowires in the second layer.

5. The crossbar of claim 1 wherein the resonant elements further comprise appropriate voltages applied to resonant element overlaying nanowires to shift a negative refractive index for a first range of wavelengths to a second range of wavelengths.

6. A dynamically reconfigurable hologram comprising:
a phase-control layer including the negative index material crossbar of claim 1 and including a two-dimensional array of phase-modulation pixels; and
an intensity-control layer including a two-dimensional array of intensity-control pixels, wherein a three-dimensional image is to be produced by electronically addressing individual phase-modulation pixels and individual intensity-control pixels to phase shift and control the intensity of light emanating from the hologram.

7. The hologram of claim 6 wherein the phase-control layer further comprises:
a first conductive layer;
a second conductive layer; and a phase modulation layer sandwiched between the first conductive layer and the second conductive layer.

8. The hologram of claim 6 wherein electronically addressing the phase-modulation pixels further comprises a selectively applied voltage to each phase-modulation pixel, each selectively applied voltage changing a refractive index of a phase-modulation pixel.

9. The hologram of claim 8 wherein changing the refractive index of a phase-modulation pixel further comprises changing a refractive index of resonant elements comprising the phase-modulation pixel.

10. The hologram of claim 6 wherein electronically addressing the intensity-control pixels further comprises a voltage applied to each intensity-control pixel, each voltage changing a refractive index of an intensity-control pixel.

11. The hologram of claim 6 wherein the intensity-control layer further comprises a liquid crystal layer.

12. The hologram of claim 6 wherein each intensity-control pixel further comprises a color filter.

13. The hologram of claim 6 wherein the three-dimensional image is to be produced by light transmitted through the hologram from a quasimonochromatic light source located on a side of the hologram opposite to where the three-dimensional image is to be produced.

14. The hologram of claim 6 wherein the three-dimensional image is to be produced by light reflected from the hologram from a quasimonochromatic light source located a same side of the hologram as where the three-dimensional image is to be produced.

15. A system for generating a three-dimensional image comprising:
a computer system including a processor and memory;
the dynamically reconfigurable hologram of claim 6 and coupled to the computer system; and
a light source positioned and configured to emit quasimonochromatic light into the hologram, wherein data representing the three-dimensional image is stored in the memory, and wherein the processor executes a computer program that displays data as the three-dimensional image by electronically addressing the phase-modulation pixels and the intensity-control pixels to phase shift and control the intensity of light emanating from the hologram.

16. A dynamically reconfigurable hologram having pixels comprising:
a phase-control layer divided into a two-dimensional array of phase-modulation pixels; and
an intensity-control layer including a two-dimensional array of intensity-control pixels,
wherein a three-dimensional image is to be produced by electronically addressing individual phase-modulation pixels and individual intensity-control pixels to phase shift and control the intensity of light emanating from the pixels of the dynamically reconfigurable hologram, and
wherein the phase-control layer comprises:
a first layer of approximately parallel first nanowires, each first nanowire having substantially regularly spaced fingers extending from opposite sides of the first nanowire;
a second layer of approximately parallel second nanowires that overlay the first layer, each second nanowire having substantially regularly spaced fingers extending from opposite sides of the second nanowire, wherein the first nanowires are approximately perpendicular in orientation to the second nanowires in the respective first and second layers and form nanowire intersections; and
resonant elements at the nanowire intersections, wherein each resonant element includes two fingers of a first nanowire and two fingers of a second nanowire.

17. The dynamically reconfigurable hologram of claim 16, wherein the phase-control layer further comprising a phase modulation layer sandwiched between the first layer and the second layer, the phase modulation layer being configured as one or more of a resistor, a semiconductor junction, and a memristor.

18. The dynamically reconfigurable hologram of claim 16, wherein electronically addressing the phase-modulation pixels comprises selectively applying a voltage to a phase-modulation pixel, the selectively applied voltage to change a refractive index of a phase-modulation pixel.

19. The dynamically reconfigurable hologram of claim 16 wherein the three-dimensional image is to be produced by light transmitted through the dynamically reconfigurable hologram.

20. A system to generate a three-dimensional image comprising:
a computer system including a processor and memory;
a dynamically reconfigurable hologram coupled to the computer system; and
a light source positioned and configured to emit quasimonochromatic light into the dynamically reconfigurable hologram,
wherein data representing the three-dimensional image is to be stored in the memory, and wherein the processor is to execute a computer program to display the stored data as the three-dimensional image by electronically addressing phase-modulation pixels and intensity-control pixels of the dynamically reconfigurable hologram to phase shift and control intensity of the quasimonochromatic light emanating from the light source, and
wherein the dynamically reconfigurable hologram comprises:
a phase-control layer divided into a two-dimensional array of phase-modulation pixels, the phase-control layer comprising a first layer of parallel nanowires and a second layer of parallel nanowires overlying and spaced apart from the first layer, each nanowire of the respective layers having regularly spaced fingers extending from opposite sides of the nanowire to form resonant elements between the first layer and the second layer, each resonant element comprising two fingers of a first layer nanowire and two fingers of a second layer nanowire; and
an intensity-control layer including a two-dimensional array of intensity-control pixels.

* * * * *